United States Patent
Grochowski et al.

(10) Patent No.: US 10,891,255 B2
(45) Date of Patent: Jan. 12, 2021

(54) HETEROGENEOUS MULTIPROCESSOR INCLUDING SCALAR AND SIMD PROCESSORS IN A RATIO DEFINED BY EXECUTION TIME AND CONSUMED DIE AREA

(71) Applicant: Intel Corporation, Santa Clara, CA (US)

(72) Inventors: Edward T. Grochowski, San Jose, CA (US); Michael E. Kounavis, Portland, OR (US); Ron Shalev, Ceaseria (IL)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 14/662,089

(22) Filed: Mar. 18, 2015

(65) Prior Publication Data

US 2016/0275043 A1    Sep. 22, 2016

(51) Int. Cl.
*G06F 9/38*    (2018.01)
*G06F 1/3293*  (2019.01)
(Continued)

(52) U.S. Cl.
CPC ........ *G06F 15/7871* (2013.01); *G06F 1/3287* (2013.01); *G06F 1/3293* (2013.01);
(Continued)

(58) Field of Classification Search
CPC ...... G06F 1/3287; G06F 1/329; G06F 1/3293; G06F 9/3887; G06F 9/4893; G06F 9/505;
(Continued)

(56) References Cited

U.S. PATENT DOCUMENTS 6,804,632 B2 * 10/2004 Orenstien ............... G06F 1/206
                                                    702/182
7,898,545 B1 *  3/2011 Alben ................... G06F 9/5044
                                                    345/502

(Continued)

OTHER PUBLICATIONS

Ohshima et al., "Parallel Processing of Matrix Multiplication in a CPU and GPU Heterogeneous Environment", Conference: High Performance Computing for Computational Science—VECPAR 2006, 7th International Conference, Rio de Janeiro, Brazil, Jun. 10-13, 2006, 15 pages.*
Viola et al., "Rapid Object Detection Using a Boosted Cascade of Simple Features", Accepted Conlefrence on Computer Vision and Pattern Recognition 2001, 9 pages.

*Primary Examiner* — David J. Huisman
(74) *Attorney, Agent, or Firm* — Nicholson De Vos Webster & Elliott LLP

(57) ABSTRACT

In one embodiment, a heterogeneous multicore processor is described that is optimized to execute multi-stage computer vision algorithms such as cascade classifier workloads. In such embodiment the heterogeneous processor includes at least one SIMD core, such as a vector processor core, coupled with one or more scalar cores. In one embodiment the heterogeneous multiprocessor executes multi-stage compute operations, where the SIMD core computes a first set of stages and the one or more scalar cores compute the second set of stages. In one embodiment, a process for designing a heterogeneous multicore processor is disclosed which optimizes the ratio of scalar to SIMD cores based on execution time of the multi-stage compute operation in relation to processor die area consumed by a processor configuration having the ratio.

8 Claims, 21 Drawing Sheets

(51) Int. Cl.
*G06F 1/3287* (2019.01)
*G06T 1/20* (2006.01)
*G06F 9/50* (2006.01)
*G06T 7/00* (2017.01)
*G06F 15/78* (2006.01)

(52) U.S. Cl.
CPC ............ *G06F 9/3885* (2013.01); *G06F 9/505* (2013.01); *G06T 1/20* (2013.01); *G06T 7/00* (2013.01)

(58) Field of Classification Search
CPC ............ G06F 15/9007; G06F 15/8007; G06F 9/3885; G06F 15/7871; G06T 1/20; G06T 7/00
See application file for complete search history.

(56) References Cited

U.S. PATENT DOCUMENTS

| | | | |
|---|---|---|---|
| 8,996,902 B2* | 3/2015 | Tu | G06F 1/206 713/323 |
| 2009/0309243 A1* | 12/2009 | Carmack | G06F 1/206 257/798 |
| 2011/0249744 A1* | 10/2011 | Bailey | G06F 9/3891 375/240.16 |
| 2014/0359251 A1* | 12/2014 | Kobayashi | G06F 15/8092 712/3 |
| 2016/0085551 A1* | 3/2016 | Greathouse | G06F 9/3851 712/206 |
| 2016/0171331 A1* | 6/2016 | Csefalvay | G06K 9/3241 382/103 |

* cited by examiner

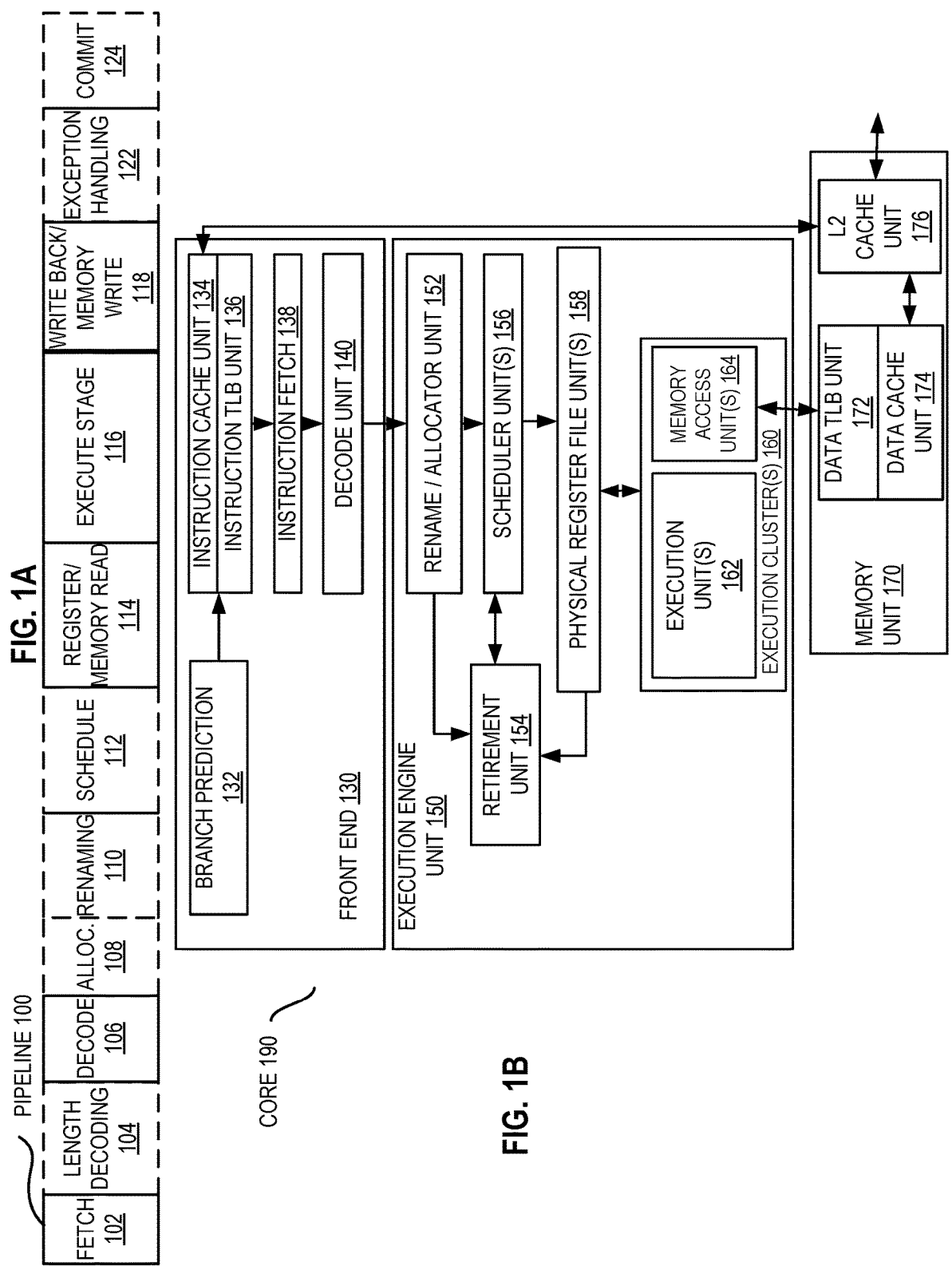

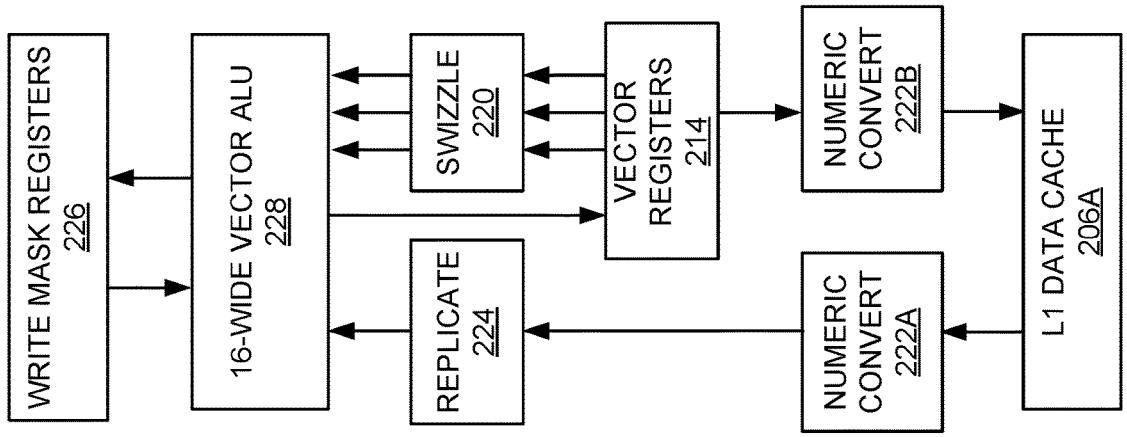
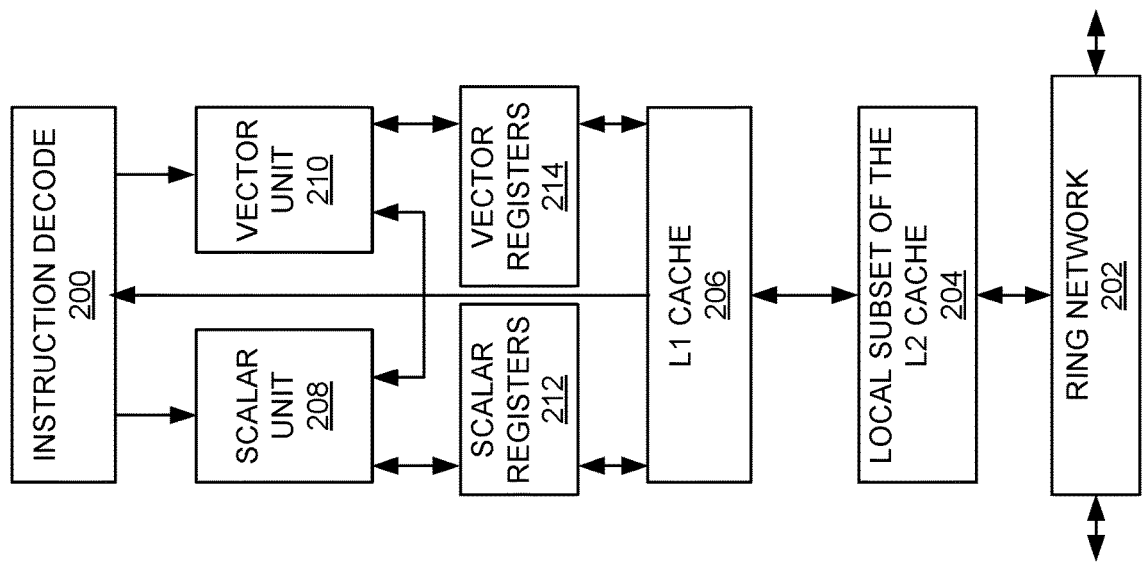

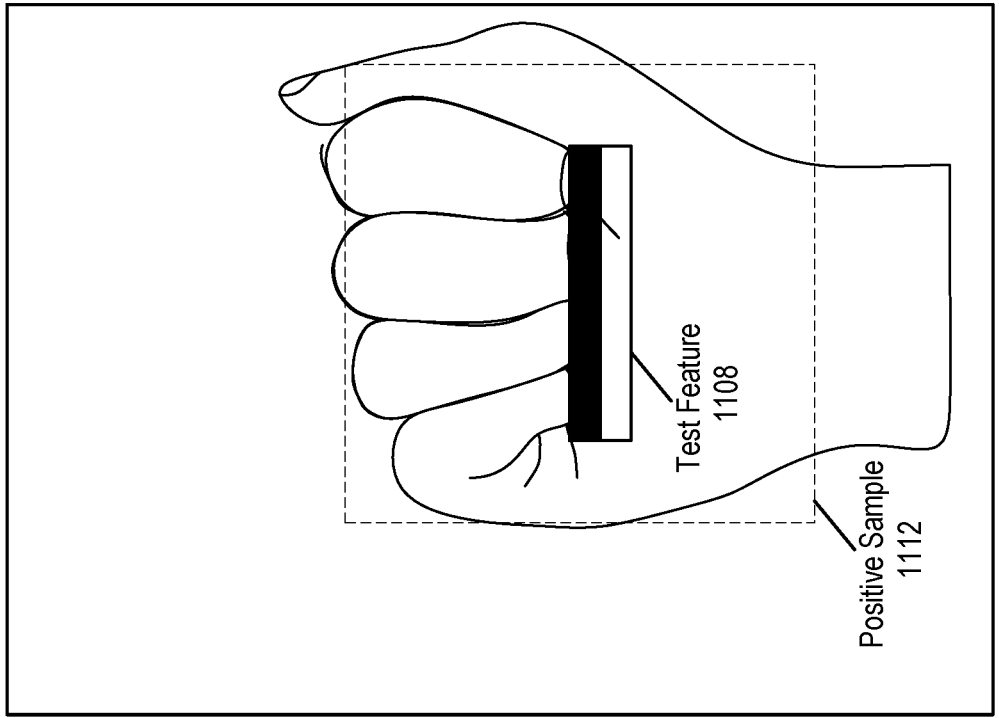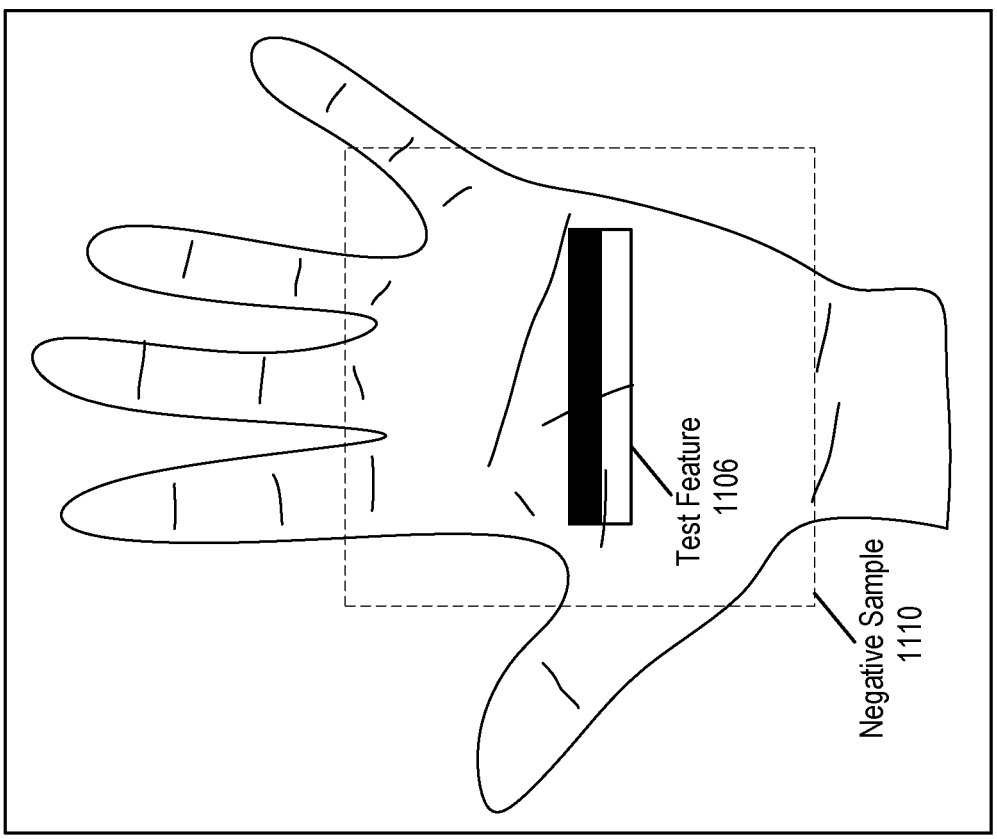
FIG. 11

HETEROGENEOUS MULTIPROCESSOR INCLUDING SCALAR AND SIMD PROCESSORS IN A RATIO DEFINED BY EXECUTION TIME AND CONSUMED DIE AREA

FIELD OF THE INVENTION

The present disclosure pertains generally to the field of processing logic and microprocessors. More specifically to the field of heterogeneous multiprocessors architecture.

BACKGROUND OF THE DESCRIPTION

In certain common mathematical calculations and graphics operations, the same operation may be performed repeatedly on each of a large number of operands. This approach is known as single instruction, multiple data (SIMD) processing, as distinguished from single instruction, single data stream (SISD) processing, also known as scalar processing. SIMD processors may be configured to execute SIMD (e.g., vector, array) instructions to perform a single operation on more than one data stream in parallel. Logic to execute SIMD instructions may be implemented by extending the width of various resources such as registers and arithmetic logic units (ALUs), allowing them to hold or operate on multiple data elements, respectively. SIMD processors may achieve good energy and area efficiency by amortizing the cost of instruction and data fetch over many arithmetic executions.

DESCRIPTION OF THE FIGURES

Embodiments are illustrated by way of example and not limitation in the Figures of the accompanying drawings, in which:

FIG. 1A is a block diagram illustrating both an exemplary in-order fetch, decode, retire pipeline and an exemplary register renaming, out-of-order issue/execution pipeline according to embodiments;

FIG. 1B is a block diagram illustrating both an exemplary embodiment of an in-order fetch, decode, retire core and an exemplary register renaming, out-of-order issue/execution architecture core to be included in a processor according to embodiments;

FIG. 2A-B are block diagrams of a more specific exemplary in-order core architecture

FIG. 11 illustrates classifier training to detect a specific hand pose, according to an embodiment;

DETAILED DESCRIPTION

Figure 3:
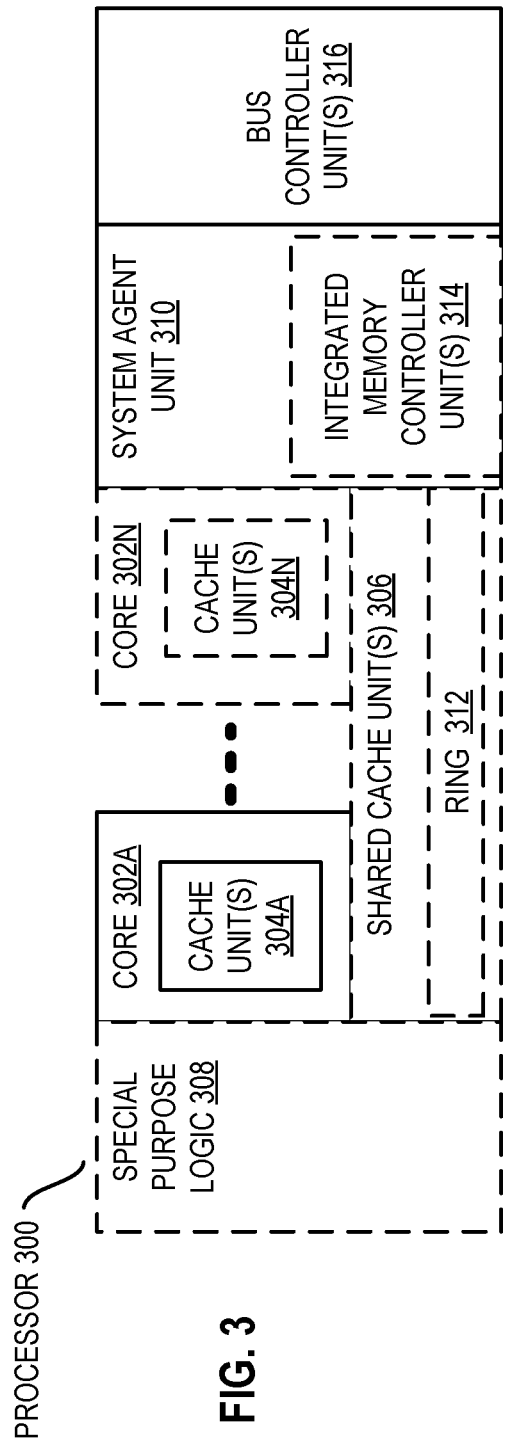
FIG. 3 is a block diagram of a single core processor and a multicore processor with integrated memory controller and special purpose logic.

SIMD execution is most efficient when data element utilization is high. By processing multiple data elements in parallel, each element pays only fraction of the energy and area costs of fetching instructions and data. However, below a certain utilization, scalar cores (e.g., single instruction single-data (SISD cores)) expend less energy and produce more performance for a given processor die area.

Computing applications that involve variable data element utilization can benefit from the use of multi-processing system having a heterogeneous computing architecture. Heterogeneous computing architectures include multiple types of computing elements within a single processing system. Different types of compute elements (e.g., processors or processor cores) may be better suited for different tasks. Accordingly, heterogeneous architectures may provide unique advantages over homogenous architectures in that more than one type of compute element is available to perform diverse computation tasks. For example, a compute element fully optimized for SIMD operation may be faster or more efficient than a scalar compute element when running certain tasks that involve a high degree of data element utilization. However, a SIMD compute element may be slower or less efficient than a scalar compute element when executing tasks in which data element utilization is low. Hardware that contains both SIMD and Scalar compute elements may be more efficient at running certain tasks or combination of tasks, such as tasks or algorithms that realize various levels of data element utilization over time.

In embodiments described herein, various implementations of a heterogeneous multicore processor are described having optimized combinations of SIMD and SISD (e.g., scalar) cores based on specific target workloads. In various embodiments, heterogeneous multicore processors are described that are optimized to perform tasks or execute algorithms that realize variable levels of data utilization over time during execution of the task or algorithm. In one embodiment, the heterogeneous processor is optimized to perform computer vision operations, such as image recognition.

Exemplary computer vision operations described include cascade classifier operations for performing computer vision operations, such as a trained cascade classifier that may be used to recognize a specific image. For example, one or more SIMD cores may more efficiently process early stages of cascade classifier operations than the scalar cores, while one or more scalar cores may efficiently process later stages of cascade classifier operations than the one or more SIMD cores.

Described below are processor core architectures followed by descriptions of exemplary processors and computer architectures according to embodiments described herein. Numerous specific details are set forth in order to provide a thorough understanding of the embodiments of the invention described below. It will be apparent, however, to one skilled in the art that the embodiments may be practiced without some of these specific details. In other instances, well-known structures and devices are shown in block diagram form to avoid obscuring the underlying principles of the various embodiments.

Exemplary Core Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Processors may be implemented using a single processor core or can include a multiple processor cores. The processor cores within the processor may be homogenous or heterogeneous in terms of architecture instruction set or microarchitecture.

Implementations of different processors include: 1) a central processor including one or more general purpose in-order cores for general-purpose computing and/or one or more general purpose out-of-order cores intended for general-purpose computing; and 2) a coprocessor including one or more special purpose cores intended primarily for graphics and/or scientific (e.g., many integrated core processors). Such different processors lead to different computer system architectures including: 1) the coprocessor on a separate chip from the central system processor; 2) the coprocessor on a separate die, but in the same package as the central system processor; 3) the coprocessor on the same die as other processor cores (in which case, such a coprocessor is sometimes referred to as special purpose logic, such as integrated graphics and/or scientific (throughput) logic, or as special purpose cores); and 4) a system on a chip that may include on the same die the described processor (sometimes referred to as the application core(s) or application processor(s)), the above described coprocessor, and additional functionality.

In-Order and Out-of-Order Core Block Diagram

FIG. 1A is a block diagram illustrating an exemplary in-order pipeline and an exemplary register renaming out-of-order issue/execution pipeline, according to an embodiment. FIG. 1B is a block diagram illustrating both an exemplary embodiment of an in-order architecture core and an exemplary register renaming, out-of-order issue/execution architecture core to be included in a processor according to an embodiment. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file unit(s) 158. Each of the physical register file unit(s) 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 158 comprises a vector registers unit, a write mask registers unit, and a scalar registers unit. These register units may provide architectural vector registers, vector mask registers, and general-purpose registers. The physical register file unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit(s), and/or execution cluster and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file unit(s) 158 and the memory unit 170 perform the register read/memory read stage 114; the execution cluster 160 perform the execute stage 116; 6) the memory unit 170 and the physical register file unit(s) 158 perform the write back/memory write stage 118; 7) various units may be involved in the exception handling stage 122; and 8) the retirement unit 154 and the physical register file unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM® instruction set (with optional additional extensions such as NEON) of ARM Holdings of Cambridge, England), including the instruction(s) described herein. In one embodiment, the core 190 includes logic to support a packed data instruction set extension (e.g., AVX1, AVX2, etc.), allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading Technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 2A-B are block diagrams of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor unit, along with its connection to the on-die interconnect network 202 and with its local subset of the Level 2 (L2) cache 204, according to an embodiment. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments may use a different approach (e.g., use a single register set or include a communication path that allow data to be transferred between the two register files without being written and read back). While the scalar unit 208, scalar registers 212, vector unit 210 and vector registers may occupy a single processor core, in one embodiment the scalar unit 208 and scalar registers 212 reside in separate processor cores than the vector unit 210 and vector registers 214, creating a heterogeneous multicore processing system in which scalar operations and vector operations may be performed by separate processing units.

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly and in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 2B is an expanded view of part of the processor in FIG. 2A according to an embodiment. FIG. 2B includes an L1 data cache 206A that is a part of the L1 cache 204, as well as more detail regarding the vector unit 210 and the vector registers 214. Specifically, the vector unit 210 is a 16-wide vector-processing unit (VPU) (see the 16-wide ALU 228), which executes one or more of integer, single-precision float, and double precision float instructions. The VPU supports swizzling the register inputs with swizzle unit 220, numeric conversion with numeric convert units 222A-B, and replication with replication unit 224 on the memory input. Write mask registers 226 allow predicating resulting vector writes. As described with respect to FIG. 2A, the VPU may reside in a separate processor core on a heterogeneous multicore processor.

Processor with Integrated Memory Controller and Special Purpose Logic

FIG. 3 is a block diagram of a processor 300 that may have more than one core, may have an integrated memory controller, and may have integrated graphics according to an embodiment. The solid lined boxes in FIG. 3 illustrate a processor 300 with a single core 302A, a system agent 310, a set of one or more bus controller units 316, while the optional addition of the dashed lined boxes illustrates an alternative processor 300 with multiple cores 302A-N, a set of one or more integrated memory controller unit(s) 314 in the system agent unit 310, and special purpose logic 308.

Thus, different implementations of the processor 300 may include: 1) a central application processor with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache 304A-N within the cores, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the integrated graphics logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N. In some embodiments, one or more of the cores 302A-N are capable of multi-threading. The cores 302A-N may be homogenous or heterogeneous in terms of architecture instruction set; that is, two or more of the cores 302A-N may be capable of execution the same instruction set, while others may be capable of executing only a subset of that instruction set or a different instruction set. The cores may also be homogenous in terms of architecture instruction set but heterogeneous in terms of microarchitecture; that is, one or more cores may be SIMD/vector processors while one or more cores may be configured as scalar processors.

The system agent 310 can include components to coordinate and operate cores 302A-N. The system agent unit 310 may include, for example, a power control unit (PCU) and a display unit. The PCU may be or include logic and components needed for regulating the power state of the cores 302A-N and the integrated graphics logic 308. The display unit is for driving one or more externally connected displays.

Exemplary Computer Architectures

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
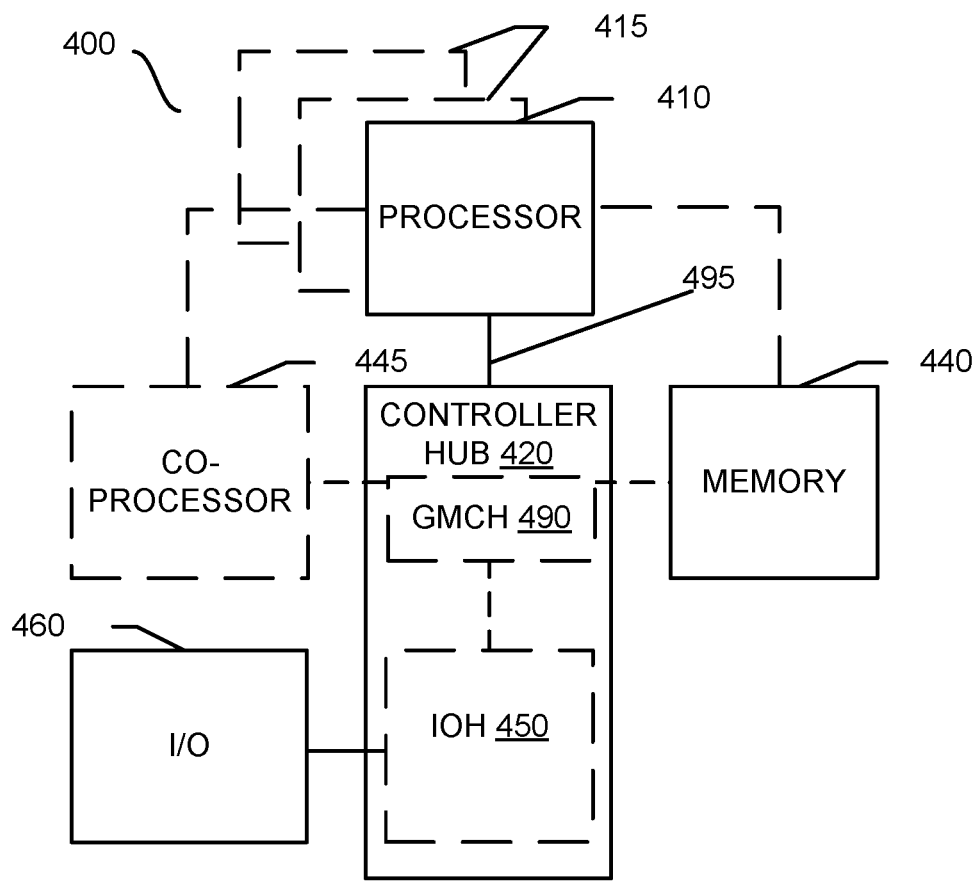
FIG. 4 illustrates a block diagram of a system in accordance with an embodiment.

FIG. 4 shows a block diagram of a system 400 in accordance with an embodiment. The system 400 may include one or more processors 410, 415, which are coupled to a controller hub 420. In one embodiment the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multi-drop bus, such as a frontside bus (FSB), point-to-point interface such as QuickPath Interconnect (QPI), or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
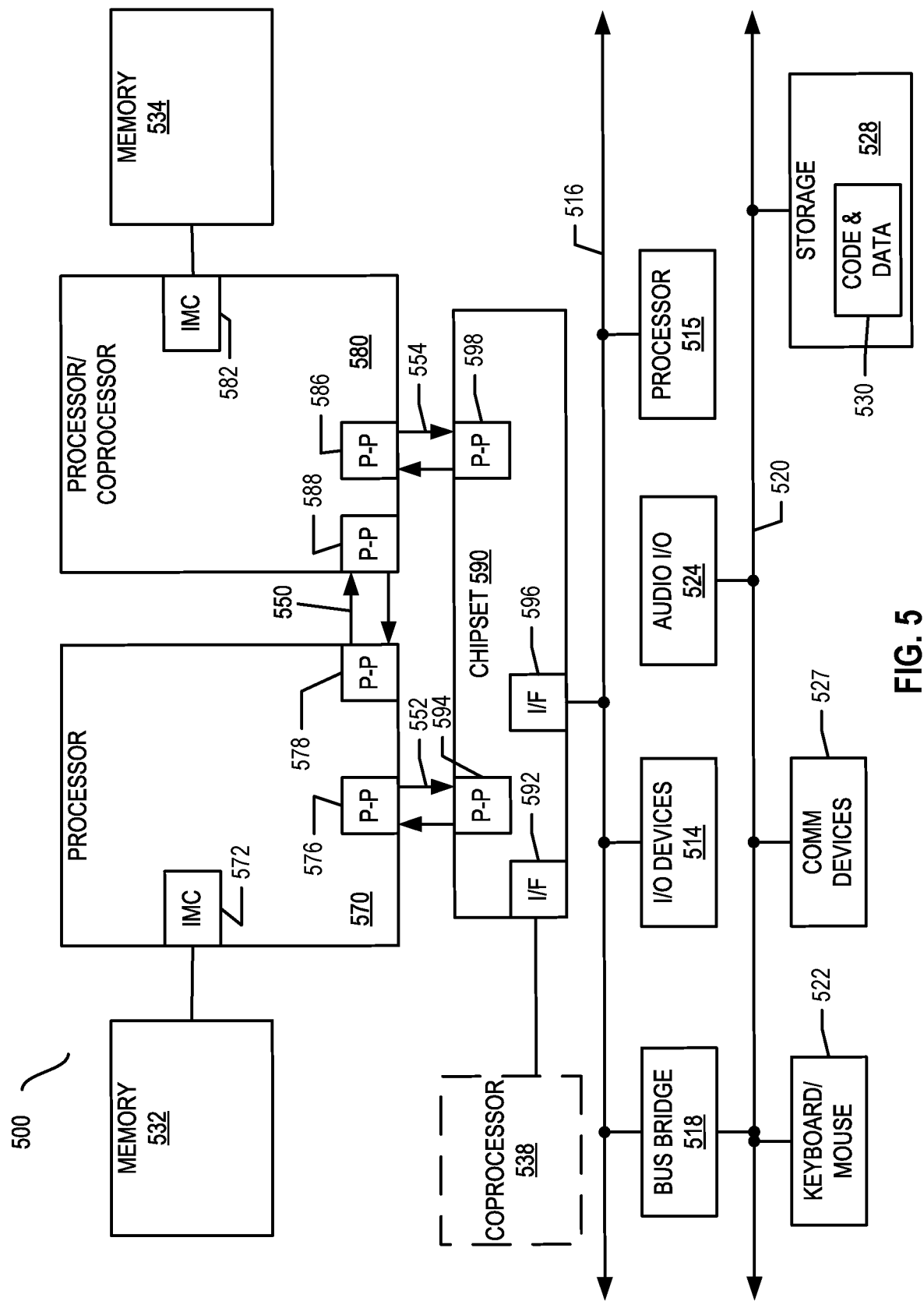
FIG. 5 illustrates a block diagram of a second system in accordance with an embodiment.

FIG. 5 shows a block diagram of a first more specific exemplary system 500 in accordance with an embodiment. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high-performance interface 592. In one embodiment, the coprocessor 538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 that couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device that may include instructions/code and data 530, in one embodiment. Further, an audio I/O 524 may be coupled to the second bus 520. Note that other architectures are possible. For example, instead of the point-to-point architecture of FIG. 5, a system may implement a multi-drop bus or other such architecture.

Figure 6:
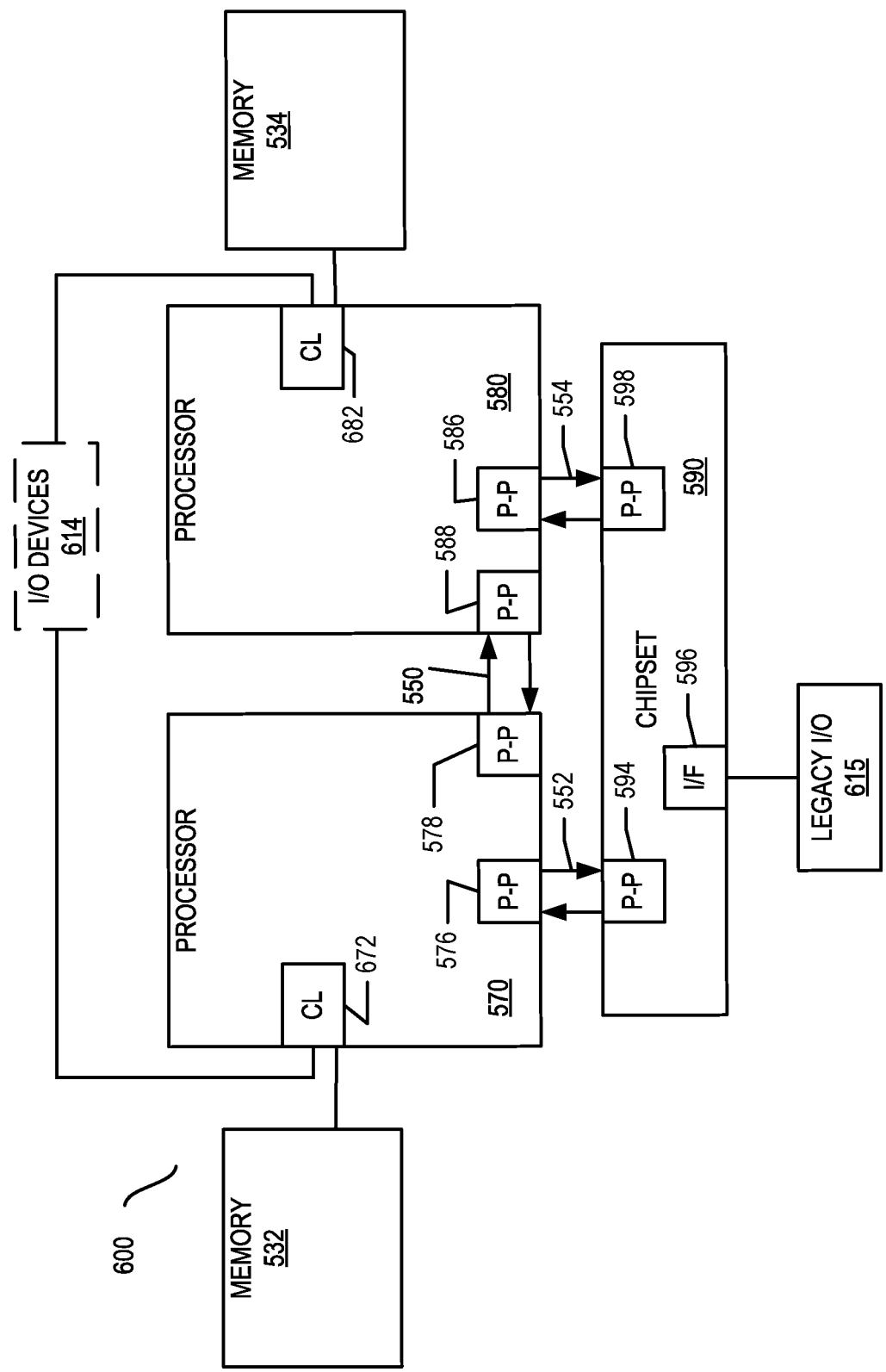
FIG. 6 illustrates a block diagram of a third system in accordance with an embodiment.

FIG. 6 shows a block diagram of a second more specific exemplary system 600 in accordance with an embodiment. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 672 and 682, respectively. Thus, the CL 572, 582 include integrated memory controller units and include I/O control logic. FIG. 6 illustrates that not only are the memories 532, 534 coupled to the CL 672, 682, but also that I/O devices 614 are also coupled to the control logic 672, 682. Legacy I/O devices 615 are coupled to the chipset 590.

Figure 7:
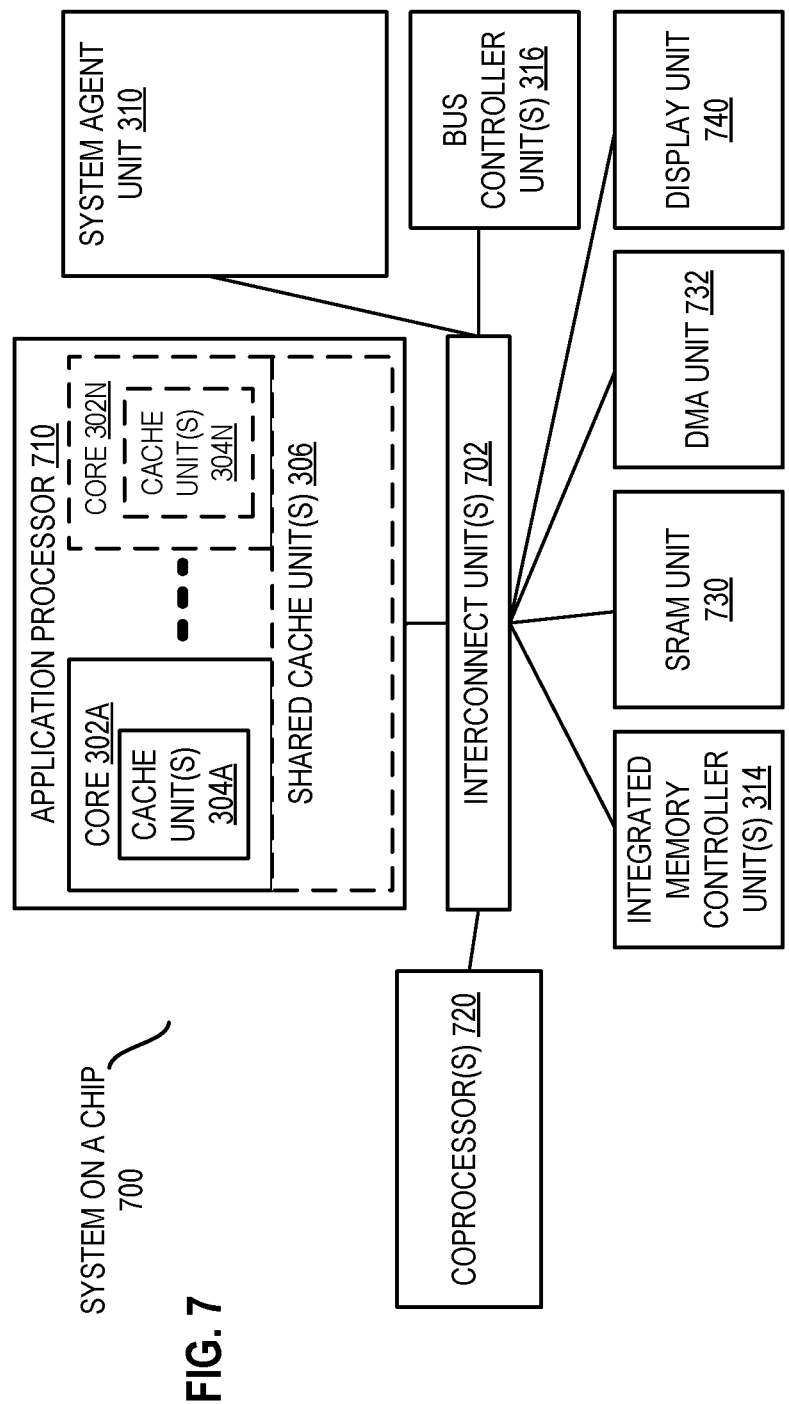
FIG. 7 illustrates a block diagram of a system on a chip (SoC) in accordance with an embodiment.

FIG. 7 shows a block diagram of a SoC 700 in accordance with an embodiment. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 202A-N and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein are implemented in hardware, software, firmware, or a combination of such implementation approaches. Embodiments are implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
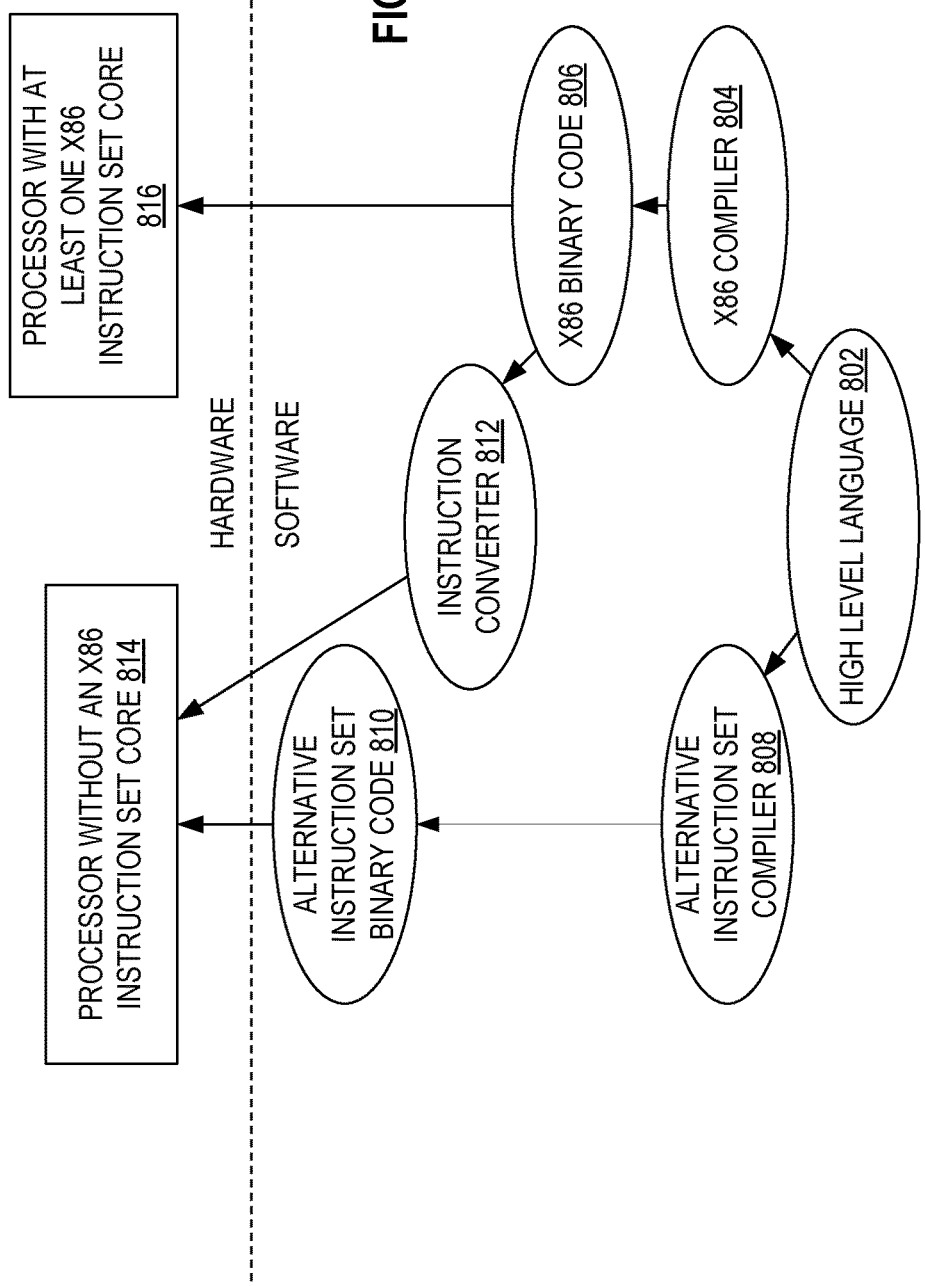
FIG. 8 illustrates a block diagram contrasting the use of a software instruction converter to convert binary instructions in a source instruction set to binary instructions in a target instruction set according to embodiments.

FIG. 8 is a block diagram contrasting the use of a software instruction converter to convert binary instructions in a source instruction set to binary instructions in a target instruction set according to an embodiment. In the illustrated embodiment, the instruction converter is a software instruction converter, although alternatively the instruction converter may be implemented in software, firmware, hardware, or various combinations thereof. FIG. 8 shows a program in a high level language 802 may be compiled using an x86 compiler 804 to generate x86 binary code 806 that may be natively executed by a processor with at least one x86 instruction set core 816.

The processor with at least one x86 instruction set core 816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 804 represents a compiler that is operable to generate x86 binary code 806 (e.g., object code) that can, with or without additional linkage processing, be executed on the processor with at least one x86 instruction set core 816. Similarly, FIG. 8 shows the program in the high level language 802 may be compiled using an alternative instruction set compiler 808 to generate alternative instruction set binary code 810 that may be natively executed by a processor without at least one x86 instruction set core 814 (e.g., a processor with cores that execute the MIPS instruction set of MIPS Technologies of Sunnyvale, Calif. and/or that execute the ARM® instruction set of ARM Holdings of Cambridge, England).

The instruction converter 812 is used to convert the x86 binary code 806 into code that may be natively executed by the processor without an x86 instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have an x86 instruction set processor or core to execute the x86 binary code 806.

Figure 9:
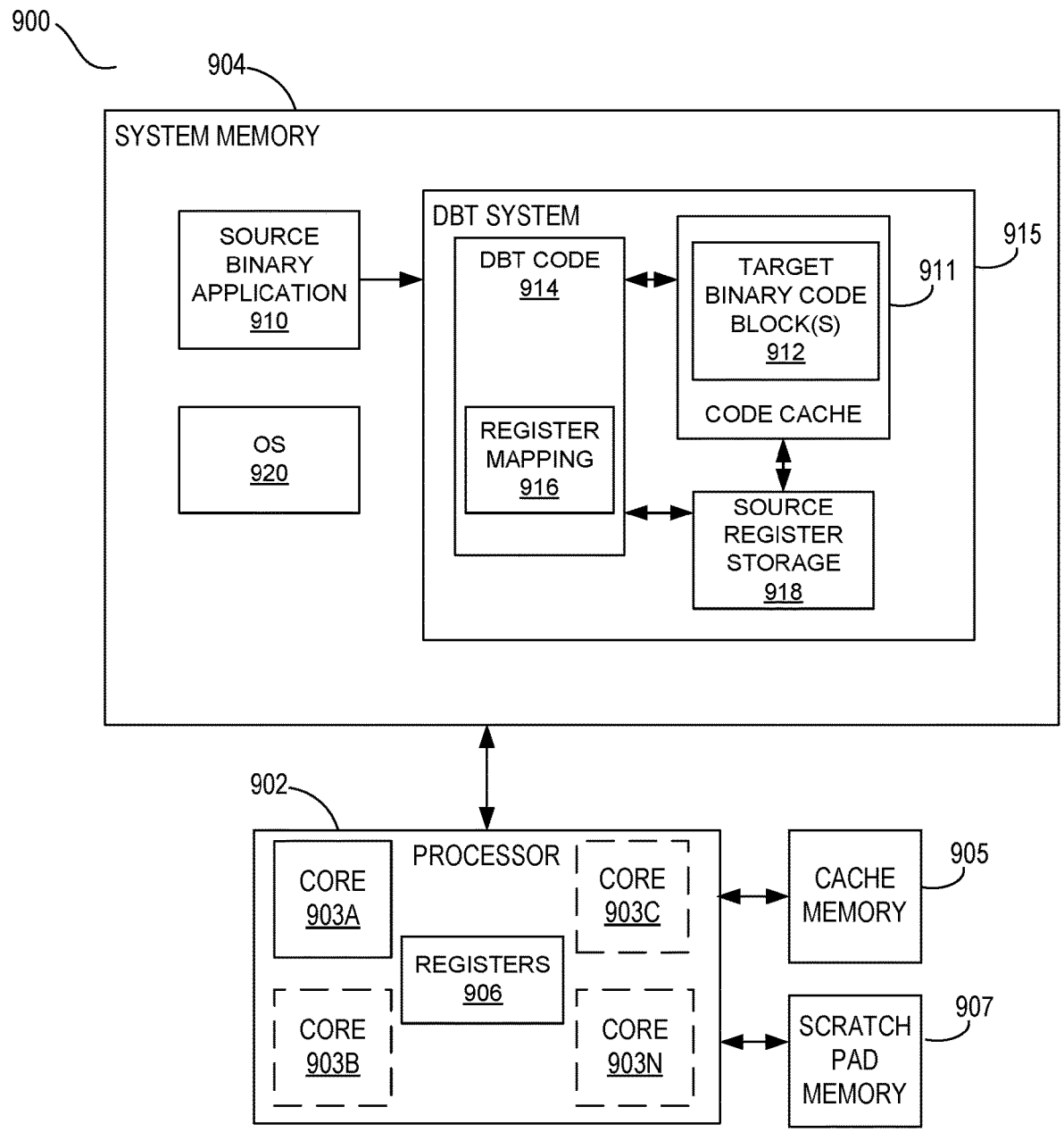
FIG. 9 is a block diagram of a computing system including a dynamic binary translation system, according to an embodiment.

In one embodiment, a binary translation system may be configured to translate and/or optimize instruction sequences in program object code during runtime operation. FIG. 9 is a block diagram of a computing system 900 including a dynamic binary translation system 915, according to an embodiment. The system 900 includes a processor 902 coupled to system memory 904. In one embodiment the system 900 additionally includes cache memory 905 (e.g., data cache unit 174 or the L2 cache unit 176 of FIG. 1) and scratchpad memory 907 coupled with or integrated within the processor 902. The processor 902 includes and a set of physical registers 906 and a one or more core processing units (e.g., core 903A-N). In one embodiment, each of the core processing units is configured to execute multiple simultaneous threads.

The system memory 904 may host a source binary application 910, the dynamic binary translation system 915 and a host operating system ("OS") 920. The dynamic binary translation system 915 may include blocks of target binary code 912, dynamic binary translator code 914 including a register mapping module 916 and/or source register storage 918. The source binary application 910 includes a set of source binary code blocks, which may be assembled low-level code or compiled high-level code. A source binary code block is a sequence of instructions that may include branching logic including increment, compare, and jump instructions.

In one embodiment the target binary code block(s) 912 are stored in an area of system memory designated a code cache 911. The code cache 911 is used as storage for target binary code block(s) 912 that have been translated from one or more corresponding blocks of source binary code block. The system memory 904 may host source register storage 918 configured to load/store data to/from processor registers 906. In some embodiments, cache memory 905 and/or scratch-pad memory 907 are configured to load/store data to/from processor register(s) 906.

In one embodiment the dynamic binary translator code 914 and register mapping module 916 are executed by one or more cores to operate on source binary application 910 to transform block(s) of source binary application 910 into target binary code block(s) 912. The target binary code block(s) 912 are configured to include the functionality of a corresponding source binary code block of the source binary application 910. In various embodiments, the dynamic binary translation system 915 performs operations including translating a source binary application 910 between instruction sets, as discussed with respect to FIG. 8, and/or performing runtime binary optimizations to a binary source application 910. While a dynamic binary translation system 915 is illustrated, in one embodiment, static binary translation is performed on a source binary application 910 before execution to create an optimized binary. In one embodiment, dynamic binary translation may be used to dynamically assign instruction workloads between various types of processor cores within a heterogeneous multicore processor.

Energy and Area Optimized Heterogeneous Multiprocessor for Cascade Computer Vision Operations Computer vision operations generally include the processing of data from one or more sensors to enable a computing system to detect or observe an object or the environment around a computing system. Video cameras are one sensor used to gather computer vision sensor information. However, computer vision algorithms may also make use of additional sensor data provided by proximity sensors, infrared sensors, ultrasonic sensors, or lidar/radar sensors to perform environmental sensing and/or object detection. Object detection algorithms can be used to perform operations such as hand, gesture, or face recognition by analyzing sensor data including or in conjunction with digitized still images or video frames.

In one embodiment, a heterogeneous multiprocessing system is described that is optimized to execute multi-stage computer vision algorithms such as cascade classifier workloads. In such embodiment the heterogeneous processor includes at least one SIMD core, such as a vector processor core, coupled with a number of scalar cores. In one embodiment the heterogeneous multiprocessor executes a cascade classifier algorithm to process an image as a set of adjacent windows, where the first stage considers all windows while subsequent stages consider fewer windows, as some windows are rejected by earlier stages. The cascade classifier algorithm may be optimized to execute on the heterogeneous multiprocessor with minimal energy consumption. In one embodiment, heterogeneous multiprocessor hardware architecture is optimized to maximize performance per unit area.

The heterogeneous processor can be configured to use less energy and achieve greater performance per unit area than homogeneous multiprocessors built from either of the component cores. In one embodiment, optimal partitioning of the cascade classifier among SIMD and scalar cores is determined by characterizing the utilization at each stage of the cascade of operations. Once the workload has been partitioned for minimal energy, a ratio of scalar to SIMD cores can be determined to provide the greatest performance per unit area (e.g., a minimum product of execution time multiplied by die area). The energy usage and performance per area data may be used, in one embodiment, to design and manufacture a heterogeneous multi-core processor or processing system that is optimized for a specific workload. In one embodiment, the energy usage and performance per area data can be used to optimize a specific workload for minimal power consumption on a heterogeneous multicore processor or processing system.

Exemplary Computer Vision Algorithm

Object detection may be performed by extracting certain image features including edges, color regions, textures, contours, or other features within the image to find configurations or combinations of the image features that correlate with an object of interest. Some algorithms for performing object detection utilize a set of 'weak' classifiers arranged in a cascade of multiple stages. An example of such 'cascade classifiers' is discussed by Paul Viola and Michael J. Jones in *Rapid Object Detection using a Boosted Cascade of Simple Features*. The Viola-Jones cascade classifier utilizes a multi-stage approach to object detection. In the multi-stage approach, each stage of the algorithm contains a large number of overlapping search windows of different sizes and positions. The classifier is designed to reject most of the search windows in the early stages of the cascade, such that that only a small number of remaining search windows are passed to the final stages of the algorithm. The search windows that survive to the last stage are deemed to contain the object of interest.

Figures 10A, 10B:
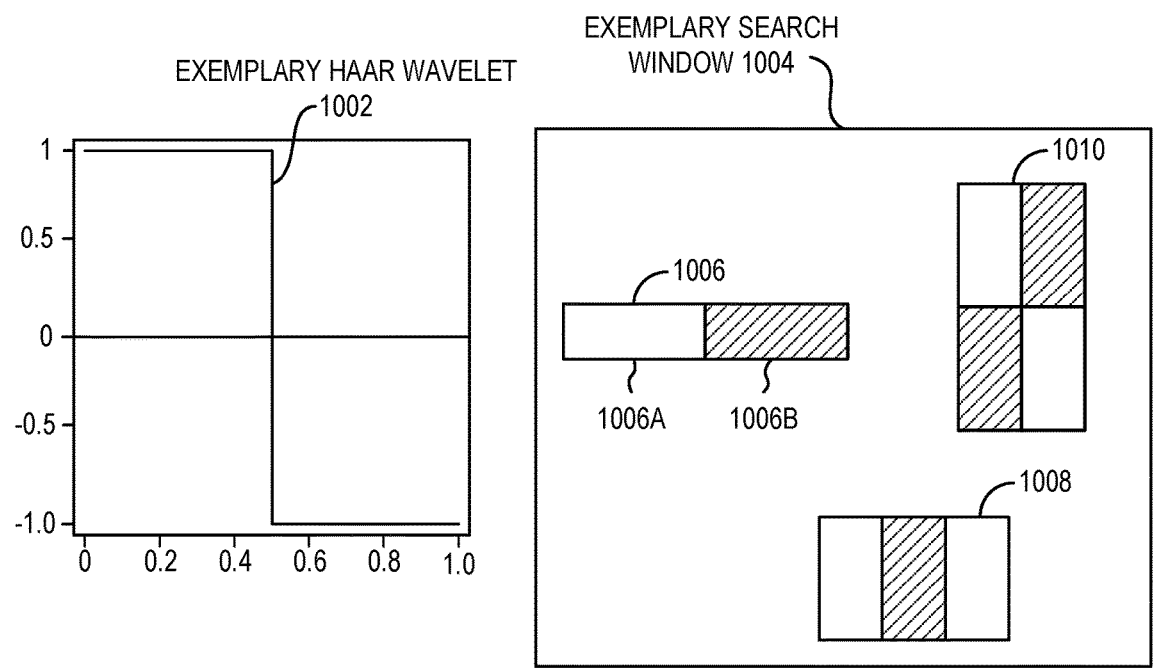
FIG. 10A-C are illustrations of exemplary elements of cascade classifier operations.

FIG. 10A is an illustration of exemplary elements used in cascade classifier operations. When performing object detection using one implementation of a cascade classifier, a portion of an image defined by each search window is evaluated using 'Haar-like' features, which are conceptually similar to Haar wavelets (e.g., exemplary Haar wavelet 1002). A Haar wavelet is a sequence of rescaled square-shaped functions that form a wavelet family or basis. Each of the Haar-like features can be described by a template (e.g., the shape of the feature), the coordinates of the feature relative to the search window origin, and the scale factor (e.g., size) of the feature. Each feature includes multiple joined 'black' and 'white' geometric primitives (e.g., rectangles) oriented in an upright or rotated position. One or more features may be included in a search window. For example, an exemplary search window 1004 is shown including a two rectangle feature 1006, a three rectangle feature 1008, and a four-rectangle feature 1010. To evaluate a feature, an image processor can compute a sum of pixel values within an un-shaded portion of a feature (e.g., 1006A) subtracted from the sum of pixel values in the shaded region of the feature (e.g., 1006B). Based on the evaluation of the features within the exemplary search window 1004, the search window is either evaluated as 'true' and allowed to pass on to further processing or evaluated as false and rejected.

FIG. 1013 is an illustration of an exemplary classifier cascade 1011. The classifier cascade 1011 is configured to initially perform a search on all search windows 1012 when entering a first stage classifier 1014. Based on evaluation of the one or more features in of a search window (e.g., features 1006, 1008, 1010 in exemplary search window 1004), the search window is evaluated as false and sent to a pool of rejected sub-windows 1022, or evaluated as true and passed to the next stage (e.g., a second stage 1016, third stage 1018, etc.). Each stage is configured to allow some number of false positives to move on to the next stage. Each stage may evaluate different numbers and types of features to classify a search window. The complexity of the evaluation may increase for each stage, such that a cascade of increasingly complex classifiers may be used at each successive stage as the number of active search windows decreases.

Figure 10C:
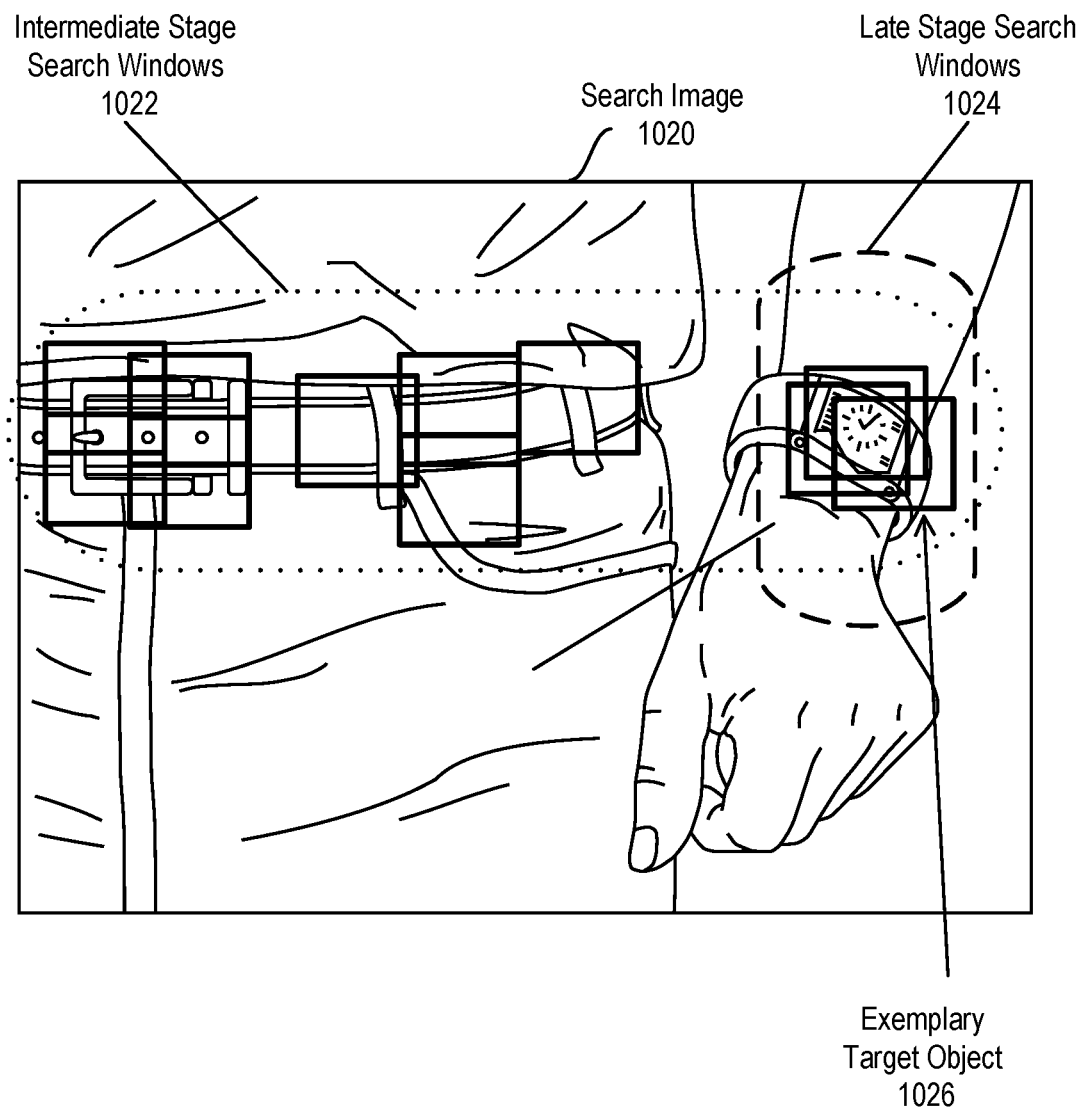

FIG. 10C is an illustration of search window reduction across the cascade classifier stages. The exemplary cascade classifier may be trained to detect an exemplary target object 1026, such as a watch face. Initial stages of the cascade classifier can evaluate search windows that cover the entirety of the search image 1020 (e.g., all search windows 1012). As stages are progressively executed on a search image 1020, search windows that do not contain features similar to one or more characteristics of at least a portion of the exemplary target object 1026 are rejected, such the set of intermediate state search windows 1022 is significantly reduced. The classification may be performed using a variety of characteristics, such as brightness, color, or shape. As the classifications at each stage become more complex, search windows are rejected until the set of late stage search windows 1024 is significantly more likely to encompass the exemplary target object 1026.

FIG. 11 illustrates classifier training to detect a specific hand pose, according to an embodiment. To detect the specific hand pose, a statistical model (e.g., classifier) can be trained to detect specific features of the object, such that the classifier will reject an image having aspects indicative of an incorrect pose 1102 while recognizing an image having aspects that are indicative of a correct pose 1104. Statistical model-based training uses multiple instances of an object of interest, including a negative sample 1110 that does not include an example of the object and a positive sample 1112 that includes an example of the object.

In one embodiment, test features 1106, 1108 can be used to sample aspects of each of the negative sample 1110 and positive sample 1112 to build a statistical model of image. The exemplary test features 1106, 1108, for example, can be used to measure differences in intensity in pixel data where the fingers of a closed first touch the palm of the hand. A value for each test feature 1106, 1108 can be determined using the sum of pixel values within the un-shaded portion of the test feature subtracted from the sum of pixel values in the shaded region of the feature. The exemplary test features 1106, 1108 and samples 1110, 1112 shown in FIG. 11 represent one aspect of the training images. Multiple images and feature types may be used to generate the classifiers and the classifiers can be configured to detect any specific image for which a training model is available. During evaluation, the classifier uses the training data to compare the test feature values with image data within the various search windows to determine if any of the locations within an image region 'look like' a portion of the particular object that the classifier is trained to detect. The classifications can be executed in an extensively data parallel manner using a SIMD core or, in one embodiment, in an instruction level parallel manner on one or more scalar cores.

Figure 12:
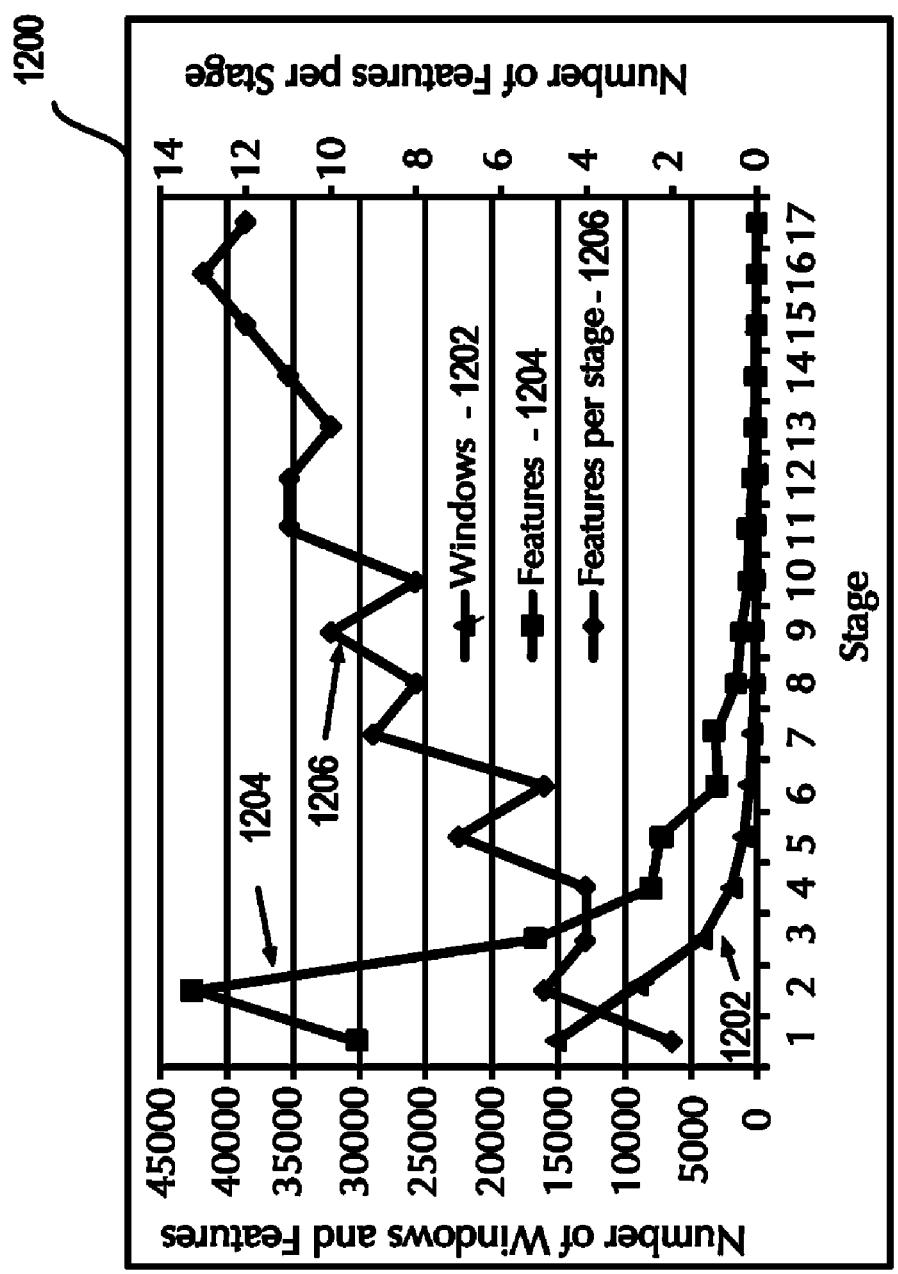
FIG. 12 is a graph of metrics associated with exemplary cascade classifier logic, according to embodiments.

FIG. 12 is a graph 1200 of metrics associated with exemplary cascade classifier logic, according to embodiments. The graph 1200 illustrates the number of search windows 1202 associated with each stage, the number of features 1204 evaluated within each window, and the resulting number of evaluated features per-stage 1206. The exemplary cascade classifier may be a trained cascade classifier that is used to recognize a specific object, such as a specific face or a specific hand pose. The cascade classifier illustrated in FIG. 12 contains 17 stages and 15,155 windows. Each window can contain between 2 to 13 features to evaluate. Evaluating a feature is the basic unit of work for the logic operations.

While cascade classifier algorithms for computer vision are described above, one having ordinary skill will recognize that such algorithm is exemplary. The embodiments described herein are not limited to any specific algorithm. Instead, embodiments are generally applicable to the design and operation of a heterogeneous multiprocessing processing system and associated logic to perform a set of multi-stage computational operations having variable data element utilization across the multiple stages. In one embodiment, the heterogeneous multiprocessing system is optimized such that one or more SIMD compute elements (e.g., processors, processor cores) of the heterogeneous processing system can execute a first set of operational stages having a high amount of data element utilization, while one or more scalar compute elements execute a second set of operational stages having a lower amount of data element utilization compared to the first set of operational stages.

In one embodiment, the heterogeneous multiprocessing system includes logic to perform load, addition, subtraction, and comparison operations to evaluate features for a classifier cascade. The SIMD compute elements included in the system include logic to perform mask operations to select a subset of multiple data elements on which to perform a specific instruction or operations during an execution cycle. The scalar compute elements include branching logic or other control flow logic to perform selective execution for specific data elements.

Exemplary Processing System

Figure 13:
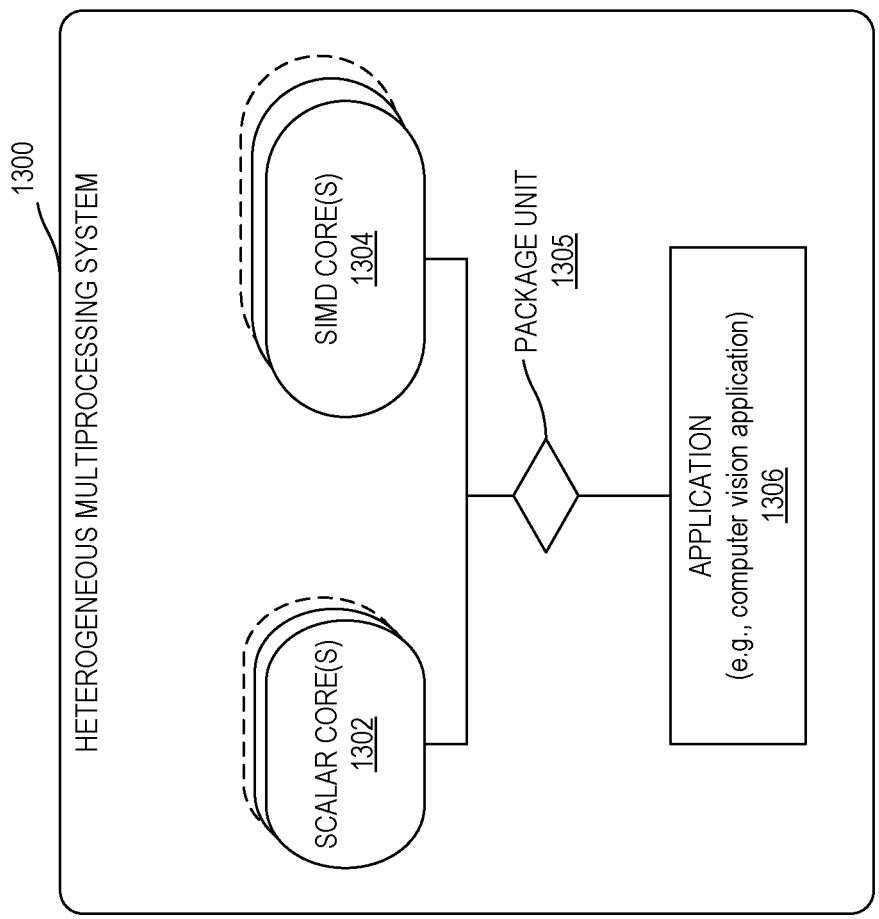
FIG. 13 is a block diagram of a heterogeneous multiprocessing system 1300, according to an embodiment.

FIG. 13 is a block diagram of a heterogeneous multiprocessing system 1300, according to an embodiment. In one embodiment, the heterogeneous multiprocessing system 1300 is a multi-core processor including one or more scalar cores 1302 coupled with one or more SIMD cores 1304. The heterogeneous multiprocessing system 1300 can be configured such that idle cores consume minimal power and a clock gating or power gating mechanism may disable cores that are expected to be idle for a period of time. In one embodiment the set of scalar cores 1302 and SIMD cores 1304 are managed in part by a package unit 1305, which manages the group of heterogeneous processor cores to determine which of the cores to enabled or disabled based on a power profile, execution profile, and/or computational throughput demands, although power management functions may also be performed by other parts of the processing system 1300.

In one embodiment, enabling or disabling the various cores enables the package unit 1305 to mediate or optimize processing system energy consumption when executing an application 1306, such as a computer vision application making use of, for example, a cascade classifier algorithm. The application 1306 may be software that is configured to execute computer vision operations or may programmable logic, such as a field programmable gate array (FPGA) that is designed to perform a specific set of computer vision operations based on sensor and image data.

In one embodiment the SIMD cores 1304 and scalar cores 1302 implement similar instruction primitives in SIMD and scalar form, respectively. In one embodiment the SIMD cores use per-element masking to conditionally evaluate each of a number of data elements using a fixed control flow. In such embodiment, the SIMD cores 1304 may be used to perform a large number of simple classifications during early stages of a cascaded computer vision operation, such as the exemplary cascade classifier described above. In contrast, the scalar cores 1302 can use conditional branching to execute a unique control flow for each element processed. The per-element control flow of the scalar cores may be used to perform more complex classifications on a smaller number of data elements during later stages of the exemplary cascade classifier.

The specific number of data elements that may be processed by the SIMD cores 1304 may vary. In one embodiment, the SIMD cores 1304 can process up to 32 data elements simultaneously using vector data element registers of 128-bit, 256-bit, and/or 512-bits wide based on the size of the data elements. For example, for 32 data elements of 16-bits in width, a 512-bit vector register is used. However, alternate numbers of data elements of differing size may also be processed. The SIMD architecture of the SIMD cores 1304 causes each of the SIMD cores 1304 to occupy a larger amount of area on the processor die in comparison to each of the scalar cores 1302. Additionally, each of the SIMD cores 1304 may consume a larger amount of energy than each of the scalar cores 1302. While the ratio of area and energy consumption varies across embodiments, in one exemplary embodiment, each SIMD core operates at a 5× ratio to each associated scalar core, such that a single one of the SIMD cores 1304 occupy five times more die area and consumes five times more power of a single one of the scalar cores 1302. However, the energy per operation of the SIMD core 1304 is determined by the power ratio divided by the maximum number of data elements in which a single one of the SIMD cores 1304 can process. Accordingly, when all data elements in use, such as in the first stage of a cascade classifier, the energy per operation for a SIMD core in the exemplary embodiment is 5/32=0.16 of the energy per operation of the scalar core. In subsequent stages, fewer vector elements are utilized (e.g., the vector elements become "sparse") and the energy advantage of the SIMD cores 1304 diminishes. Once the data utilization falls below a threshold, the scalar cores 1302 become more efficient per operation.

Optimization of Heterogeneous Configuration

In one embodiment, an optimal partitioning of the cascade classifier among SIMD and scalar cores of the processor can be determined by characterizing the utilization at each stage of the cascade of operations. Once the workload has been partitioned for minimal energy, a ratio of scalar to SIMD cores can be determined to provide the greatest performance per unit area (e.g., a minimum product of execution time multiplied by die area). In one embodiment, the optimized ratio of scalar to SIMD cores may be used to manufacture a specific heterogeneous multicore processor configuration that is optimized to perform specific computer vision operations. In one embodiment, a heterogeneous multicore processor having a large number of scalar and SIMD cores may be dynamically configured at runtime to enable or disable certain scalar or SIMD cores to optimize performance in relation to energy consumption. In one embodiment, specific operational details of the computer vision logic can be adjusted and optimized for execution on a heterogeneous multicore processor. For example, processor and/or thread assignments between the SIMD and scalar cores may be dynamically adjusted at runtime based on performance characteristics or energy consumption of the SIMD or scalar cores, or adjusted based on a performance profile that is pre-determined for a specific algorithm.

Figure 14:
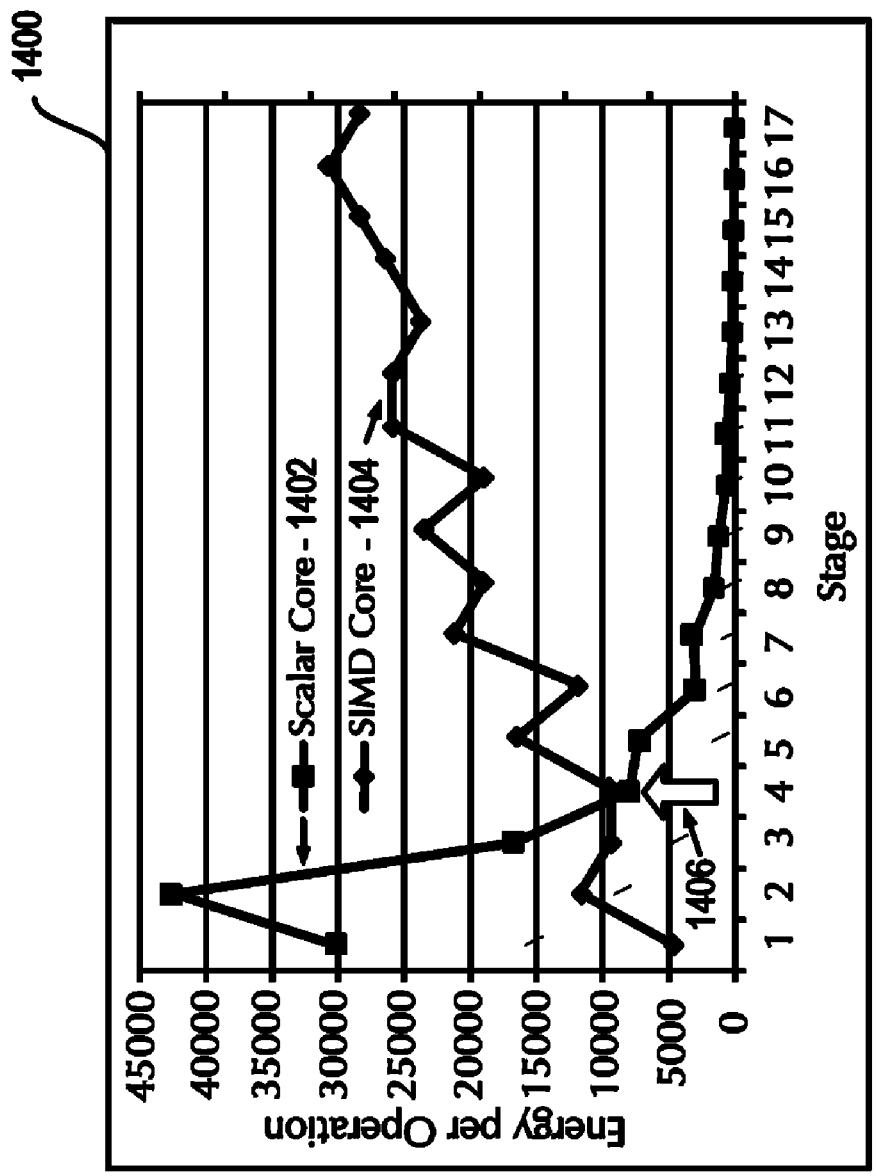
FIG. 14 is a graph illustrating an exemplary determination of energy consumption per stage for SIMD and scalar processor cores.

FIG. 14 is a graph 1400 illustrating an exemplary determination of energy consumption per stage for SIMD and scalar processor cores. A workload for a multi-stage computer vision operation can transition from the SIMD core to the scalar core to minimize overall energy consumption. In one embodiment, to determine the transition stage, optimization logic performs a characterization operation in which each stage of the multi-stage computer vision operation is executed on at least one of the scalar cores and at least one of the SIMD cores. An exemplary determination of the characterization operation is shown in graph 1400.

Graph 1400 shows the per-operation energy consumption for the scalar core 1402 and the SIMD core 1404 for each stage of an exemplary multi-stage compute operation. The energy per operation, under most circumstances, is generally deterministic based on data element utilization. In early stages of the compute operation where SIMD data utilization is high, the per-operation energy consumption of the SIMD core 1404 is significantly lower than the per-operation energy consumption of the scalar core 1402. In subsequent stages the vector elements become sparse and the per-operation energy consumption of the SIMD core 1404 diminishes. Once the data utilization falls below a transition threshold 1406, the scalar cores 1402 become more efficient per operation. In one embodiment, based on microarchitecture distinctions between the SIMD cores and the scalar cores, the transition threshold 1406 occurs at stage 4, as shown in graph 1400. However, the transition threshold 1406 may vary between embodiments and algorithms based at least in part on processor core microarchitecture and data element utilization of a workload of a given algorithm or the specific logic used to perform such algorithm.

Management logic can be configured to transition the workload for the computer vision operation to exclusively execute on the scalar core after the transition threshold 1406. In one embodiment, the transition threshold is pre-determined based on profiling data that is used to characterize energy consumption for a specific algorithm. In one embodiment the transition threshold is dynamically determined at runtime when configuring the heterogeneous multi-core processor to perform a specific operation. Such dynamic determination may be performed at system level by a runtime environment or explicitly by application level logic that implements a given set of operations. In one embodiment, an embedded system includes embedded logic (e.g., ASIC, FPGA, processor microcode, firmware, etc.) configured to manage the cores of the heterogeneous multicore processor, including performing operations to dynamically transition workloads between SIMD and scalar cores. Such transition may be based on dynamic power consumption assessments, pre-determined workload profiles, and/or pre-configured power profiles.

Figure 15:
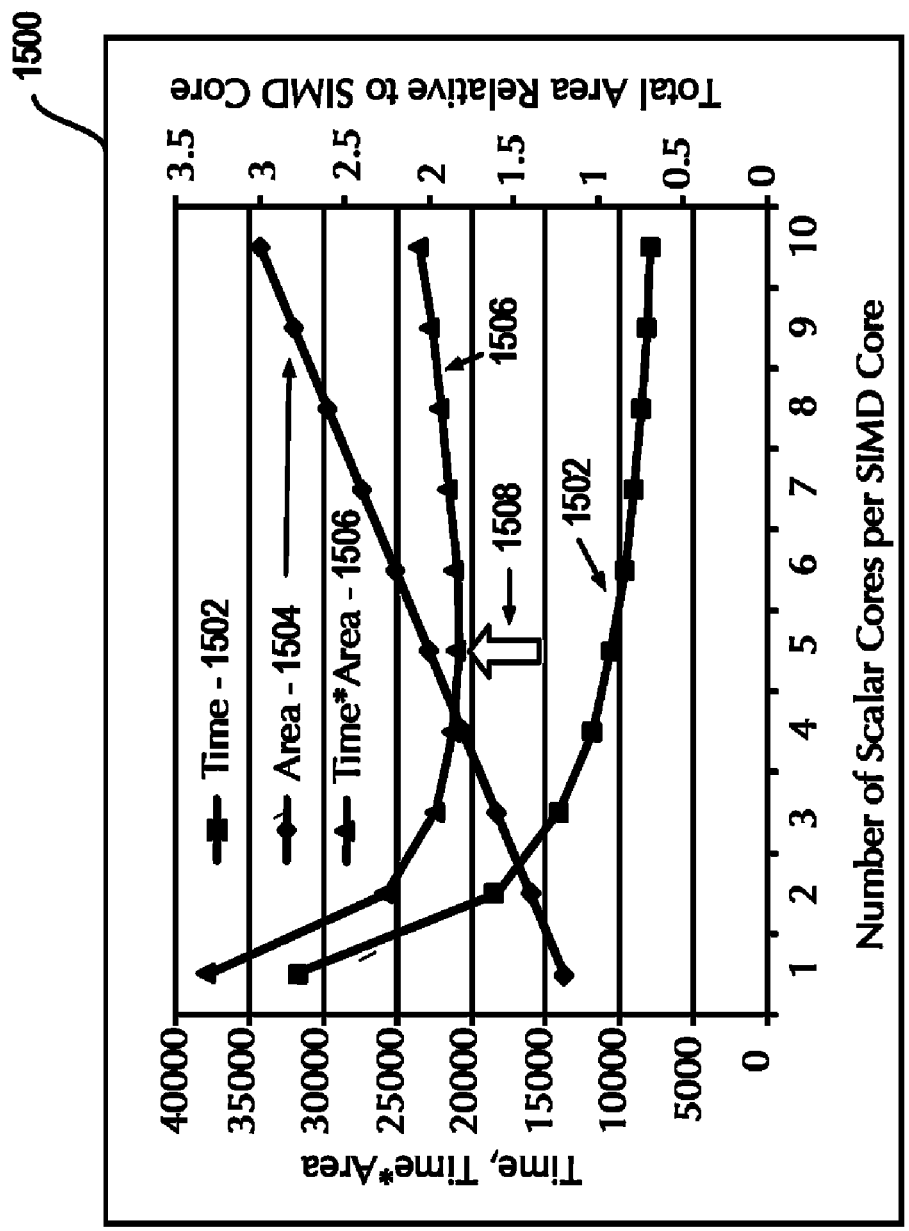
FIG. 15 is a graph illustrating an exemplary determination of an optimal ratio of scalar to SIMD cores.

FIG. 15 is a graph 1500 illustrating an exemplary determination of an optimal ratio of scalar to SIMD cores. In one embodiment, additional operations can be performed to determine an optimal ratio of scalar to SIMD cores. In one embodiment, this determination may be performed to maximize performance per unit area, which can be determined as a minimum product of execution time multiplied by die area. The determination considers the amount of time required to execute a specific workload and the amount of processor die area consumed by a heterogeneous multiprocessor containing SIMD and scalar cores. Should a heterogeneous multi-core processor configuration include too few scalar cores the compute performance of the processor may suffer, resulting in excess execution time. Should the processor configuration include more scalar cores than optimal, the processor will consume more die area than optimal for the desired workload.

In one embodiment, an optimal ratio may be determined via an analysis of the execution time 1502 of an operation for a given number of scalar cores per each SIMD core in relation to the processor area 1504 consumed by such processor configuration. The processor area may be analyzed as a measure of the total processor area of the number of scalar cores in the configuration in relation to the processor area consumed by a single SIMD core. A product including the execution time multiplied by the area consumed 1506 can be determined for each number of scalar cores per SIMD core. A measure of optimal performance per area can be determined by finding the minimum 1508 of such product. In one embodiment, based on microarchitecture distinctions between the SIMD cores and the scalar cores, the optimal performance per area (e.g., minimal product of execution time and die area) is five scalar cores for each SIMD core. However, the optimal ratio may vary across embodiments and configurations.

Figure 16:
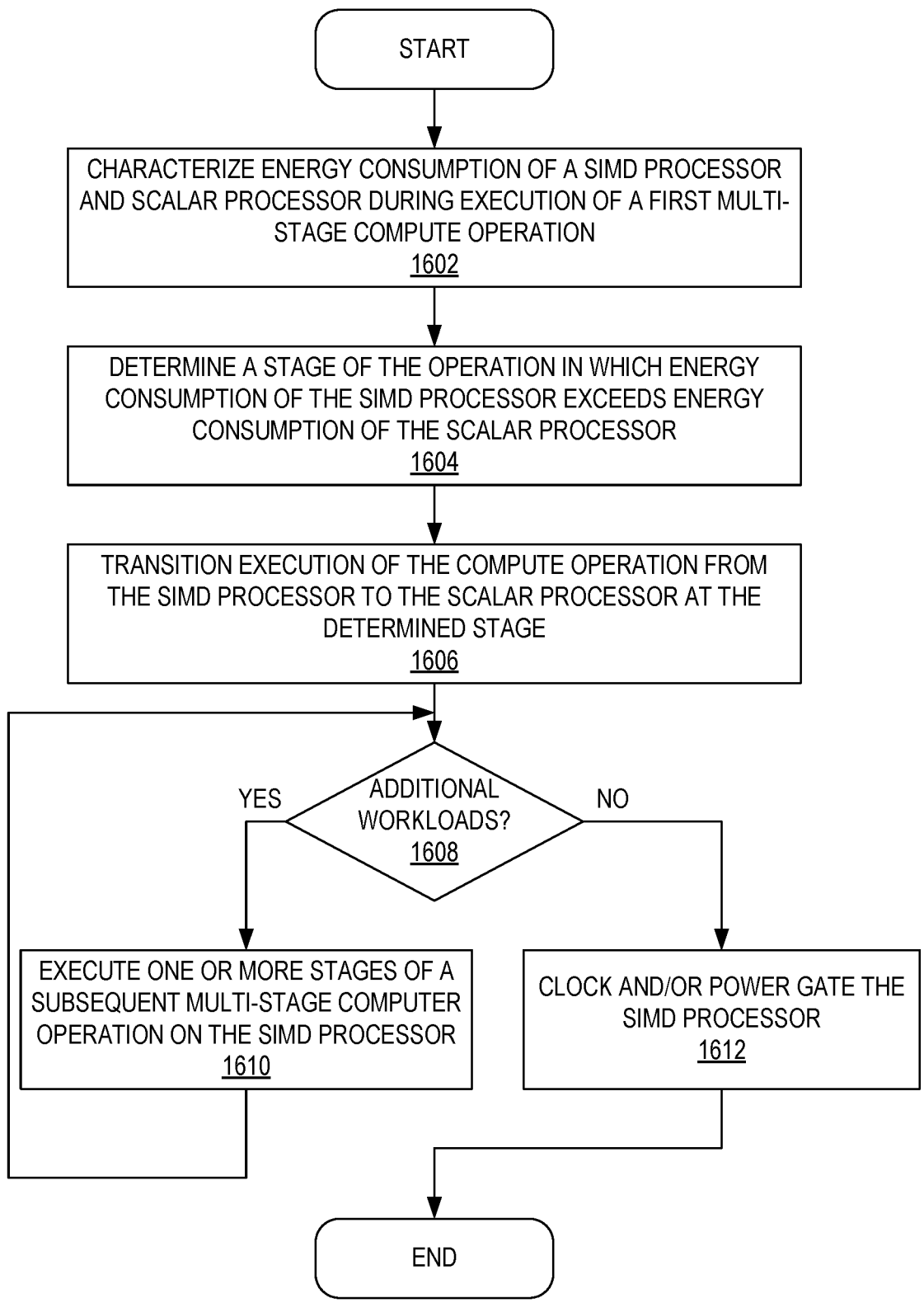
FIG. 16 is a flow diagram of logic to optimize energy consumption of a heterogeneous multiprocessing system, according to an embodiment.

FIG. 16 is a flow diagram of logic 1600 to optimize energy consumption of a heterogeneous multiprocessing system, according to an embodiment. In one embodiment the system includes logic 1600 to characterize energy consumption of a SIMD processor and a scalar processor during execution of a first multi-stage compute operation, as shown at block 1602. The SIMD processor and scalar processor may be complete processing devices or processor cores, where multiple processor cores may be included within a processor device. The multi-stage compute operation may be a computer vision operation to perform object detection, such as gesture detection, hand pose recognition, or facial recognition. In one embodiment, the multi-stage compute operation is a cascade classifier operation.

In one embodiment, at least a portion of the logic 1600 is performed at design time for a heterogeneous multiprocessing system, for example, via computer aided design software used to simulate, model, and design integrated circuits, including processors for use in a heterogeneous processing system. In one embodiment, the logic 1600 is performed at runtime by a runtime system executing on the multiprocessing system, or via system management logic configured to manage the multiprocessing system. In one embodiment, at least a portion of the logic 1600 is performed to optimize a computer vision operation for execution on a heterogeneous multiprocessing system, such that the operation transitions workloads between SIMD and scalar compute elements.

As shown at block 1604, the system additionally includes logic 1600 to determine a stage of the operation in which energy consumption of the SIMD processor exceeds the energy consumption of the scalar processor. As shown at block 1606, the logic 1600 is configured to transition execution of the compute operation from the SIMD processor to the scalar processor at the determined stage in which the energy consumption of the SIMD processor exceeds the energy consumption of the scalar processor.

In one embodiment, where the system is configured to perform runtime optimization of energy consumption, the logic 1600 additionally is configured to determine at block 1608 if any additional workloads are pending on the processing system. If additional workloads are pending, the logic 1600 can be configured to execute one or more stages of a subsequent multi-stage compute operation on the SIMD processor in a pipelined manner, as shown at block 1610. When no additional workloads are pending, as shown at block 1612, the logic 1600 can clock gate or power gate the SIMD processor while the scalar processors execute the remainder of the multi-stage compute operation.

While a transition from a SIMD processor or processor core to a scalar processor or processor is described above, based on the workload of the multi-stage computer operation it is conceivable that a transition from the scalar processor or processor core may be performed. For example, where a multi-stage compute operation shows increasing data parallelism from early stages to later stages, a heterogeneous multiprocessing system may be configured to perform a first set of stages for the compute operation on the scalar cores and second set of compute operations on the SIMD cores.

Heterogeneous Processing System Design.

Figure 17:
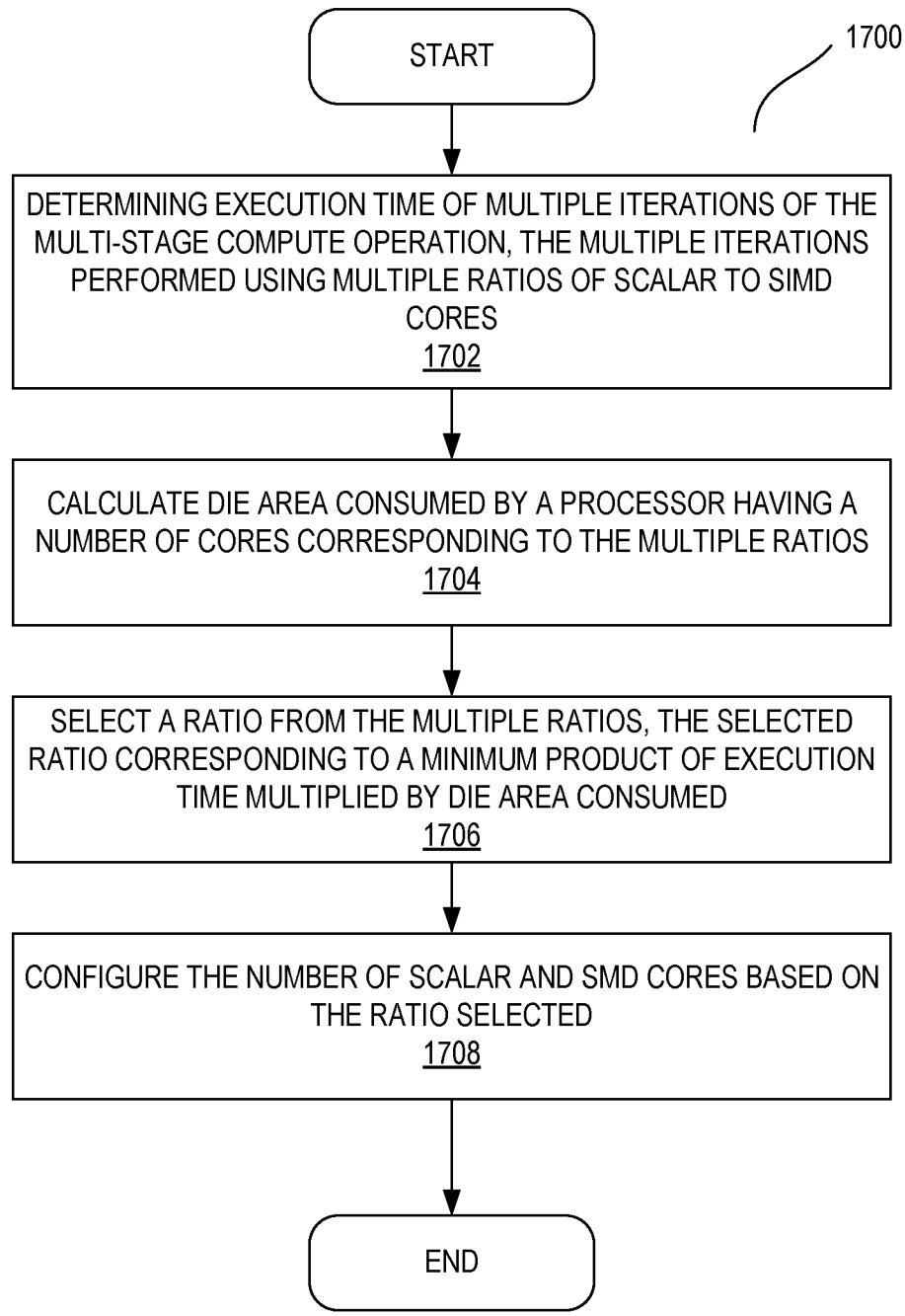
FIG. 17 is a flow diagram of logic to optimize a ratio of scalar to SIMD compute elements within a heterogeneous multiprocessing system.

FIG. 17 is a flow diagram of logic 1700 to optimize a ratio of scalar to SIMD compute elements within a heterogeneous multiprocessing system. The logic 1700 may be used during a logic modelling process to generate a functional design of the heterogeneous multiprocessing system. In one embodiment, the logic 1700 determines an optimal ratio of scalar to SIMD compute elements within the heterogeneous multiprocessing system based on execution time of a specific multi-stage compute operation in relation to the processor die area consumed. Exemplary metrics for the optimization are described above in relation to FIG. 15.

In one embodiment, the logic 1700 is to perform a logic modeling process including determining the execution time of multiple iterations of the multi-stage compute operation using multiple ratios of scalar to SIMD cores, as shown at block 1702. The process additionally includes calculating die area consumed by a processor having a number of cores corresponding to the multiple ratios, as shown at block 1704. As shown at block 1706, the process additionally includes selecting a ratio from the multiple ratios, where the selected ratio corresponds to a minimum product of the execution time multiplied by the die area consumed by a heterogeneous multiprocessing system having scalar and SIMD processor cores in the selected ratio. The number of scalar and SIMD cores are configured, as shown at block 1708, based on the ratio selected. In one embodiment, such configuration includes configuring the heterogeneous multiprocessing system to include a number of scalar and SIMD cores corresponding to the ratio selected. This configuration may be performed at runtime by enabling or disabling one or more processor cores or at design time by configuring a heterogeneous multicore processor design to have a number of cores corresponding to the ratio selected.

In one embodiment, the configuration determined in FIG. 17 used to generate a functional design of the processing system before manufacturing one or more integrated circuits based on the design. The functional design may be implemented by code stored on a machine-readable medium that represents and/or defines logic within an integrated circuit. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the model on fabrication machines that manufacture the integrated circuit. The integrated circuit may be fabricated such that the circuit performs operations described in association with any of the embodiments described herein.

Figure 18:
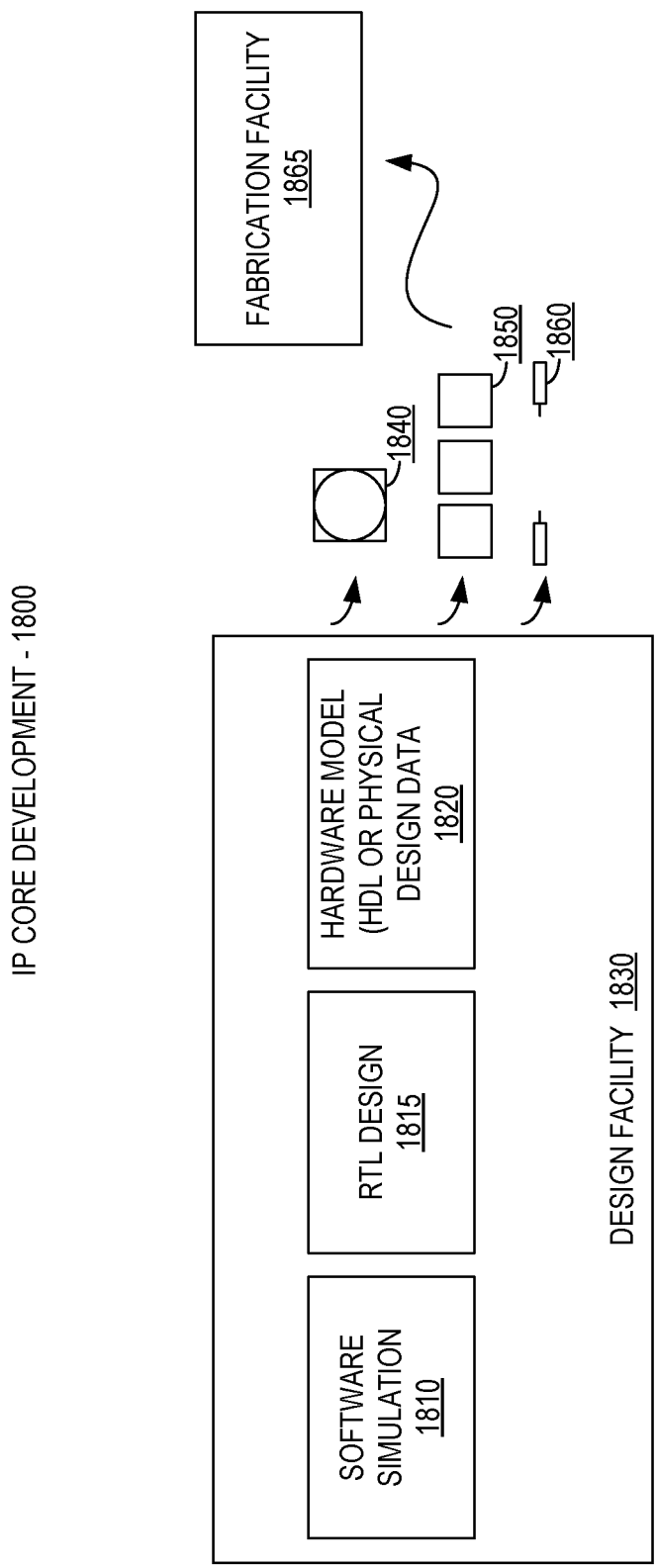
FIG. 18 is a block diagram illustrating an IP core development system that may be used to manufacture an integrated circuit to perform operations according to an embodiment.

FIG. 18 is a block diagram illustrating an IP core development system 1800 that may be used to manufacture an integrated circuit to perform operations according to an embodiment. The IP core development system 1800 may be used to generate modular, reusable designs that can be incorporated into a larger design or used to construct an entire integrated circuit (e.g., an SOC integrated circuit). A design facility 1830 can generate a software simulation 1810 of an IP core design in a high level programming language (e.g., C/C++). The software simulation 1810 can be used to design, test, and verify the behavior of the IP core. A register transfer level (RTL) design can then be created or synthesized from the simulation model. The RTL design 1815 is an abstraction of the behavior of the integrated circuit that models the flow of digital signals between hardware registers, including the associated logic performed using the modeled digital signals. In addition to an RTL design 1815, lower-level designs at the logic level or transistor level may also be created, designed, or synthesized. Thus, the particular details of the initial design and simulation may vary.

The RTL design 1815 or equivalent may be further synthesized by the design facility into a hardware model 1820, which may be in a hardware description language (HDL), or some other representation of physical design data. The HDL may be further simulated or tested to verify the IP core design. The IP core design can be stored for delivery to a third party fabrication facility 1865 using non-volatile memory 1840 (e.g., hard disk, flash memory, or any non-volatile storage medium). Alternatively, the IP core design may be transmitted (e.g., via the Internet) over a wired connection 1850 or wireless connection 1860. The fabrication facility 1865 may then fabricate an integrated circuit that is based at least in part on the IP core design. The fabricated integrated circuit can be configured to perform operations in accordance with at least one embodiment described herein.

Figure 19:
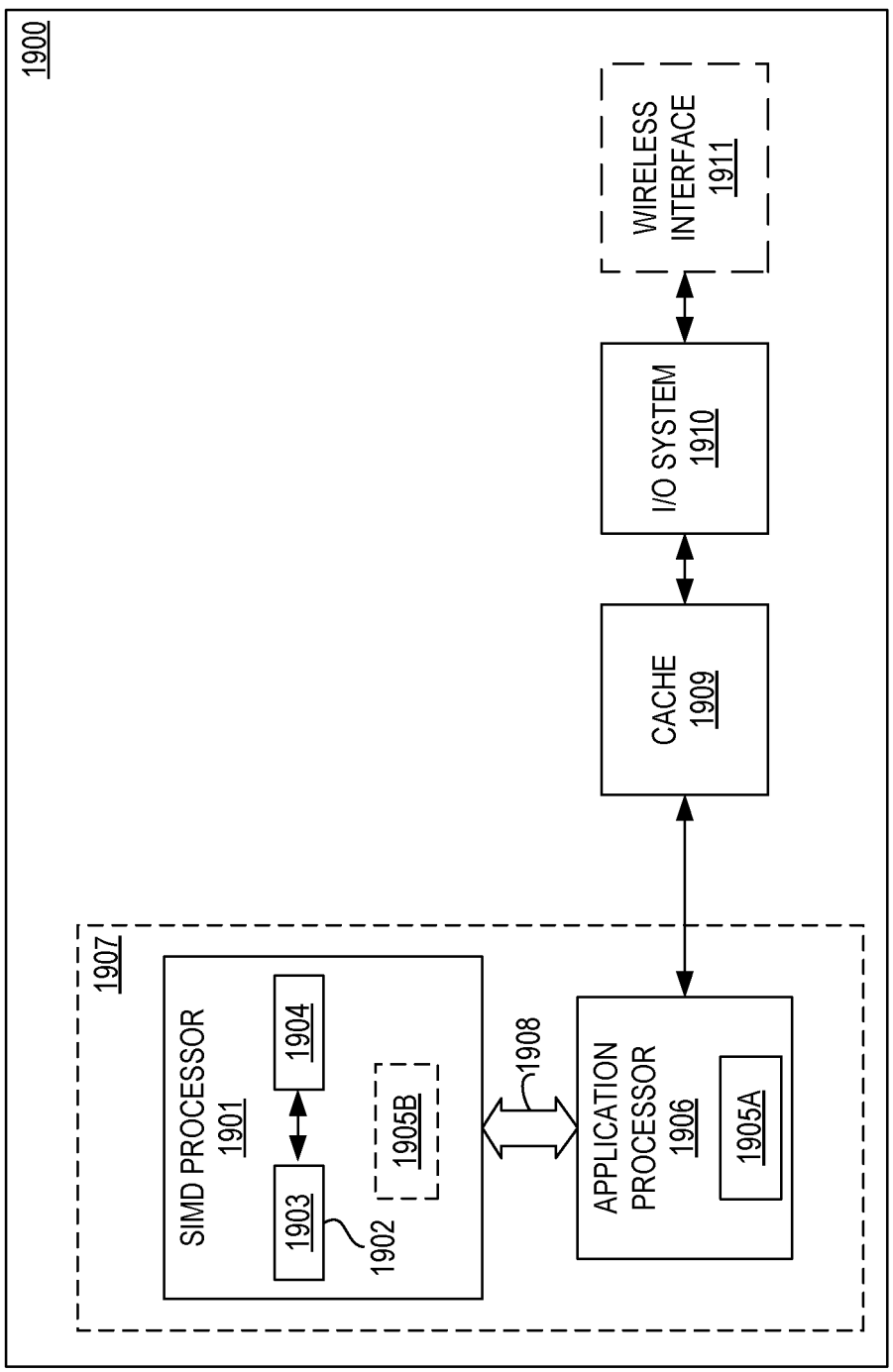
FIG. 19 illustrates an additional embodiment of a heterogeneous data processing system, according to an embodiment.

FIG. 19 illustrates an additional embodiment of a heterogeneous data processing system 1960, according to an embodiment. In one embodiment the data processing system 1900 includes an application processor 1906 and a SIMD processor 1901 within a single processor core 1907. However, alternate embodiments include a data processing system in which the application processor 1906 and SIMD processor 1901 occupy separate processor cores. The data processing system 1900 additionally includes cache memory 1909 coupled to the application processor 1906 within the processor core 1907, as well as an input/output (I/O) system 1910, which may optionally couple with a wireless interface 1911. In one embodiment, SIMD operations may be independently scheduled on the SIMD processor 1901. In one embodiment, the SIMD processor is a coprocessor device that works explicitly in conjunction with the application processor 1906. The SIMD processor 1901 and the application processor 1906 couple via a high bandwidth processor bus 1908 that, in one embodiment, is a coprocessor bus coupled to multiple additional co-processing devices.

In one embodiment the SIMD processor 1901 includes a SIMD execution unit 1902 and a set of one or more vector register files 1904. The SIMD execution unit 1902 includes logic to execute instruction set 1903, which may be a subset or superset of the instruction set of the application processor 1906, or may be a separate instruction set. One embodiment of application processor 1906 includes a decoder 1905A to recognize and decode instructions of an instruction set 1903. The SIMD execution unit 1902 within the SIMD processor 1901 may execute at least some of the instructions decoded by the decoder 1905A, when the SIMD processor 1901 is configured as a co-processor. In one embodiment, SIMD processor 1901 also comprises at least part of a decoder 1905B, to separately decode instructions of the instruction set 1903.

In operation, the application processor 1906 executes a stream of data processing instructions that control data processing operations of a general type including interactions with the cache memory 1909 and the I/O system 1910. Embedded within the stream of data processing instructions may be SIMD coprocessor instructions. The decoder 1905A of application processor 1906 can recognize the SIMD coprocessor instructions as being of a type that should be executed by an attached SIMD coprocessor, which may be the SIMD processor 1901. Accordingly, the application processor 1906 can issue these SIMD coprocessor instructions (or control signals representing SIMD coprocessor instructions) on the high bandwidth processor bus 1908, where any attached SIMD coprocessors may receive the instructions. In one embodiment, where the SIMD processor 1901 is configured as a coprocessor, the SIMD processor 1901 will accept and execute any received SIMD coprocessor instructions intended for execution by the SIMD processor 1901.

Data may be received via wireless interface 1911 for processing by the SIMD processor 1901. The data may be digital images or video frames from a remote camera interface or a remote processing device that utilizes the SIMD processor 1901 and the application processor 1906 (e.g., as a scalar processor) to perform computer vision operations, such as a cascade classifier operation, or other computer vision operations to perform object detection such as facial recognition, gesture detection, or hand pose recognition. In one embodiment, compressed audio and/or video may be received in the form of a digital bit stream, which may be processed by the SIMD processor 1901 to regenerate digital audio samples and/or video frames. In one embodiment, object recognition, or other computer vision operations may be performed on the received video frames. However, embodiments are not strictly limited to computer vision operations. In one embodiment, voice communication may be received in the form of a digital signal, which may be processed by the SIMD processor 1901 and the application processor 1906 to regenerate digital audio samples representative of the voice communications. In one embodiment the SIMD processor 1901 and application processor 1906 may work in concert to perform image or other signal processing operations.

Processing core 1907 may be suitable for manufacture in one or more process technologies and by being represented on a machine readable media in sufficient detail, may be suitable to facilitate the manufacture of all or part of data processing system 1900, including the respective components of the processing core 1907.

Figure 20:
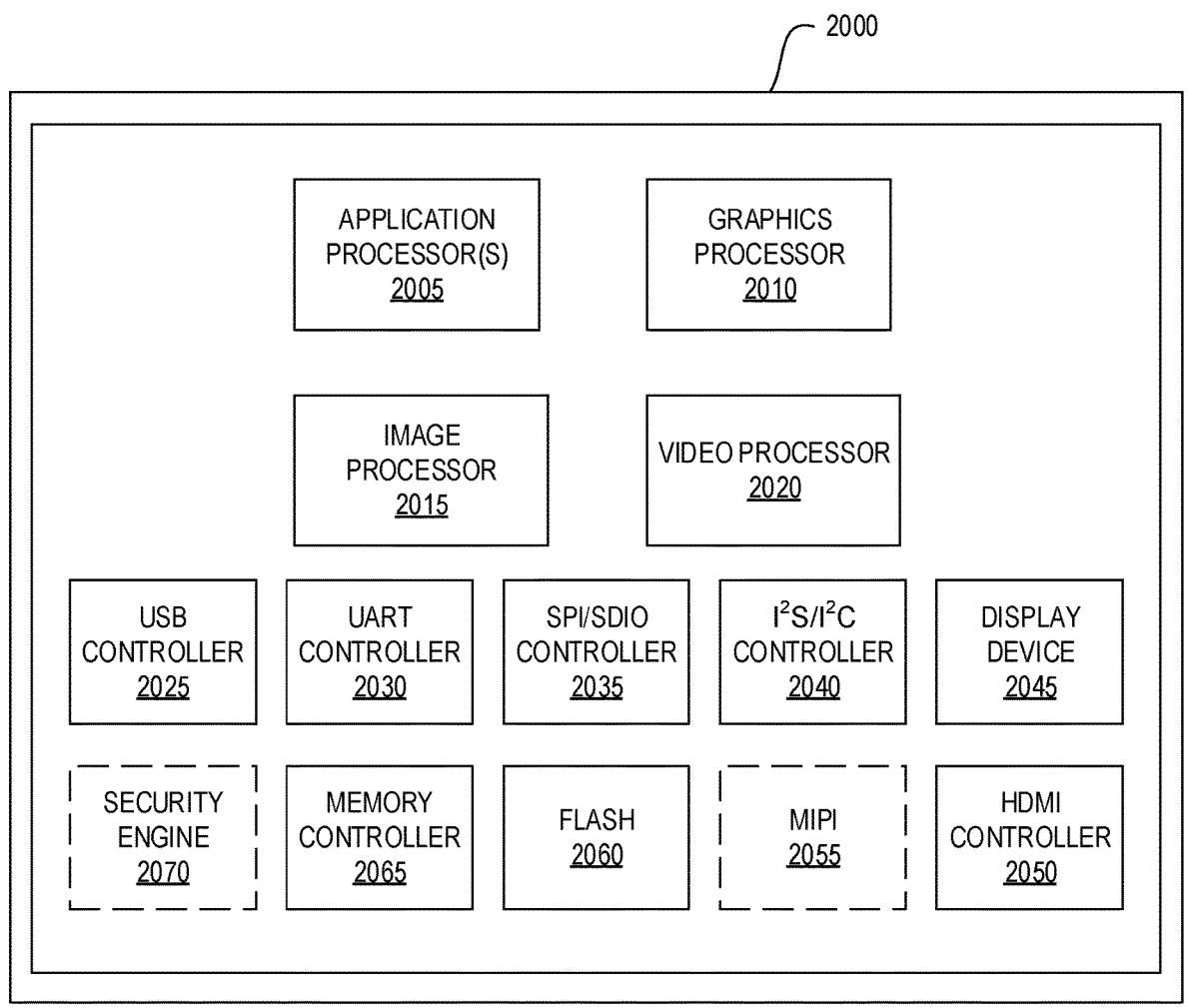
FIG. 20 is a block diagram illustrating an exemplary system on a chip integrated circuit, according to an embodiment.

FIG. 20 is a block diagram illustrating an exemplary system on a chip integrated circuit 2000, according to an embodiment. The exemplary integrated circuit includes one or more application processors 2005, at least one graphics processor 2010, as well as an image processor 2015 and/or a video processor 2020, any of which may be a modular IP core from the same or multiple different design facilities. The integrated circuit includes peripheral or bus logic including a USB controller 2025, UART controller 2030, an SPI/SDIO controller 2035, and an I$^2$S/I$^2$C controller 2040. Additionally, the integrated circuit can include a display device 2045 coupled to one or more of a high-definition multimedia interface (HDMI) controller 2050 and a mobile industry processor interface (MIPI) display interface 2055. Storage may be provided by a flash memory subsystem 2060 including flash memory and a flash memory controller. Memory interface may be provided via a memory controller 2065 for access to SDRAM or SRAM memory devices. Some integrated circuits additionally include an embedded security engine 2070.

Additionally, other logic and circuits may be included in the processor of integrated circuit 2000, including additional graphics processors/cores, peripheral interface controllers, or general-purpose processor cores. In one embodiment, the image processor 2015 and/or video processor 2020 include logic to perform computer vision operations as described herein. Accordingly, the image processor 2015 and/or video processor 2020 and may be heterogeneous processors including SIMD and scalar cores, or may include one or more SIMD cores that operate in conjunction with one or more application processors 2005 to perform heterogeneous scalar/SIMD operations as described herein.

In some embodiments, the logic and instructions described herein refer to specific configurations of hardware, such as application specific integrated circuits configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims that follow.

What is claimed is:

1. A processing apparatus comprising:
 a single instruction multiple data (SIMD) processor; and
 a scalar processor coupled with the SIMD processor, wherein each processor includes circuitry to perform multi-stage compute operations, the SIMD processor to execute a first set of stages and the scalar processor to execute a second set of stages, wherein a total number of scalar processors and SIMD processors are in a ratio defined by a minimum product equal to an execution time of the multi-stage compute operations multiplied by die area consumed, wherein all of the scalar processors and SIMD processors each reside within separate processor cores.

2. The apparatus as in claim 1, additionally comprising circuitry to power or clock gate the scalar processors during the first set of stages.

3. The apparatus as in claim 1, additionally comprising circuitry to power or clock gate the SIMD processors during the second set of stages.

4. The apparatus as in claim 1, wherein the circuitry to perform multi-stage compute operations includes circuitry to perform a computer vision operation, the computer vision operation including image recognition.

5. The apparatus as in claim 4, wherein the circuitry to perform image recognition includes circuitry to perform a cascade classifier operation to recognize a specific image.

6. The apparatus as in claim 5, wherein the circuitry to perform the cascade classifier operation includes circuitry to perform a load, addition, subtraction, and comparison operation.

7. The apparatus as in claim 6, wherein each SIMD processor includes additional circuitry to perform the cascade classifier operation, the additional circuitry including mask operation circuitry.

8. The apparatus as in claim 6, wherein each scalar processor includes additional circuitry to perform the cascade classifier operation, the additional circuitry including branch operation circuitry.

* * * * *